United States Patent
Asadi et al.

(10) Patent No.: US 10,366,103 B2
(45) Date of Patent: Jul. 30, 2019

(54) LOAD BALANCING FOR ELASTIC QUERY SERVICE SYSTEM

(71) Applicant: SAP SE, Walldorf (DE)

(72) Inventors: Mohsen Asadi, Vancouver (CA); Jacky Hu, Vancouver (CA); Thanh Nguyen, Vancouver (CA)

(73) Assignee: SAP SE, Walldorf (DE)

( * ) Notice: Subject to any disclaimer, the term of this patent is extended or adjusted under 35 U.S.C. 154(b) by 230 days.

(21) Appl. No.: 15/392,750

(22) Filed: Dec. 28, 2016

(65) Prior Publication Data
US 2018/0121513 A1    May 3, 2018

Related U.S. Application Data

(60) Provisional application No. 62/416,117, filed on Nov. 1, 2016.

(51) Int. Cl.
*G06F 16/00* (2019.01)
*G06F 16/27* (2019.01)
*G06F 16/2458* (2019.01)

(52) U.S. Cl.
CPC .......... *G06F 16/27* (2019.01); *G06F 16/2471* (2019.01)

(58) Field of Classification Search
CPC ...... G06F 16/27; G06F 16/2471; G06F 16/00; G06F 17/30283; G06F 17/30477; G06F 17/30575; G06F 17/30545; G06F 17/30315; G06F 17/30339; G06F 17/30584; G06F 17/30; G06F 17/2705; G06F 17/30011; G06F 17/30946; G06F 17/30094; G06F 17/30312; G06F 17/30372; G06K 9/00442

See application file for complete search history.

(56) References Cited

U.S. PATENT DOCUMENTS

| | | | |
|---|---|---|---|
| 2005/0038789 A1* | 2/2005 | Chidambaran | H04L 67/1031 707/999.01 |
| 2005/0038829 A1* | 2/2005 | Chidambaran | G06F 17/30283 707/999.104 |
| 2008/0235291 A1* | 9/2008 | Lahiri | G06F 11/2035 |
| 2011/0258614 A1* | 10/2011 | Tamm | G06F 11/3644 717/129 |
| 2011/0276579 A1* | 11/2011 | Colrain | G06F 17/30557 707/756 |
| 2012/0047107 A1 | 2/2012 | Doddavula et al. | |
| 2012/0096093 A1 | 4/2012 | Bouw et al. | |
| 2013/0060922 A1* | 3/2013 | Koponen | H04L 12/4633 709/223 |
| 2014/0278590 A1* | 9/2014 | Abbassi | G06Q 30/0283 705/5 |
| 2015/0058290 A1 | 2/2015 | Hu et al. | |

(Continued)

*Primary Examiner* — Anh Ly
(74) *Attorney, Agent, or Firm* — Fountainhead Law Group P.C.

(57) ABSTRACT

Some embodiments provide a non-transitory machine-readable medium that stores a program. The program receives a query for data from a dataset stored in at least one database instance in a plurality of database instances. The program further determines a set of candidate database instances in the plurality of database instances that stores the dataset. The program also selects a database instance in the set of candidate database instances based on a set of metrics associated with the set of candidate database instances. The program further processes the query using the selected database instance.

20 Claims, 11 Drawing Sheets

(56) References Cited

U.S. PATENT DOCUMENTS

| | | | |
|---|---|---|---|
| 2015/0278315 A1* | 10/2015 | Baumgartner | G06F 16/248 |
| | | | 715/763 |
| 2016/0034547 A1* | 2/2016 | Lerios | G06F 16/254 |
| | | | 707/602 |
| 2016/0127274 A1* | 5/2016 | Casado | H04L 45/02 |
| | | | 370/400 |
| 2016/0371156 A1* | 12/2016 | Merriman | G06F 11/1464 |
| | | | 707/E17.014 |
| 2017/0103116 A1* | 4/2017 | Hu | G06F 16/213 |
| 2018/0121513 A1* | 5/2018 | Asadi | G06F 17/30575 |
| | | | 707/E17.009 |
| 2018/0121529 A1* | 5/2018 | Asadi | G06F 17/30575 |
| | | | 707/E17.045 |

\* cited by examiner

LOAD BALANCING FOR ELASTIC QUERY SERVICE SYSTEM

CROSS-REFERENCE TO RELATED APPLICATION

The present application claims the benefit and priority of U.S. Provisional Application No. 62/416,117, filed Nov. 1, 2016, entitled "Elastic Query Service Systems and Methods," the entire contents of which are incorporated herein by reference in its entirety for all purposes.

BACKGROUND

Modern computer systems often comprise an application program and a database. The application program may present a user interface that allows users to perform a wide range of data processing tasks. The application program may be a cloud application, for example. Data received in the system can be stored in the database. Many users may send large amounts of queries to these computing systems handle for processing. In some cases, such large amounts of queries can overwhelm the database and lead to increased response times and/or reduced performance.

SUMMARY

In some embodiments, a non-transitory machine-readable medium stores a program. The program receives a query for data from a dataset stored in at least one database instance in a plurality of database instances. The program further determines a set of candidate database instances in the plurality of database instances that stores the dataset. The program also selects a database instance in the set of candidate database instances based on a set of metrics associated with the set of candidate database instances. The program further processes the query using the selected database instance.

In some embodiments, the set of metrics may include resource usage of the set of candidate database instances and a set of dataset metric based on a plurality of queries for data from the dataset previously processed by the set of candidate database instances. Selecting the database instance may include identifying a subset of candidate database instances in the set of candidate database instances having a metric that is higher than the remaining candidate database instances in the set of candidate database instances and randomly selecting a candidate database instance in the subset of candidate database instances as the selected database instance. Each dataset metric in the set of dataset metrics may be calculated based on a set of response times for the set of queries in the plurality of queries for data from the dataset previously processed by the associated candidate database instance.

In some embodiments, the query may be a first query for data from a first dataset, the set of candidate database instances may be a first set of candidate database instances, the database instance may be a first database instance, and the plurality of queries may be a first plurality of queries. The program may further receive a second query for data from a second dataset stored in at least one database instance in the plurality of database instances. The program may also determine a second set of candidate database instances in the plurality of database instances that stores the second dataset. The program may further select a second database instance in the second set of candidate database instances based on the set of metrics associated with the second set of candidate database instances. The program may also process the second query using the selected, second database instance.

In some embodiments, the program may further determine information associated with the processing of the query. The program may also store the information for later retrieval in the processing of additional queries for data from the dataset. The plurality of queries for data from the dataset may be previously processed by the set of candidate database instances within a defined interval of time.

In some embodiments, a method receives a query for data from a dataset stored in at least one database instance in a plurality of database instances. The method further determine a set of candidate database instances in the plurality of database instances that stores the dataset. The method also selects a database instance in the set of candidate database instances based on a set of metrics associated with the set of candidate database instances. The method further processes the query using the selected database instance.

In some embodiments, the set of metrics may include resource usage of the set of candidate database instances and a set of dataset metric based on a plurality of queries for data from the dataset previously processed by the set of candidate database instances. Selecting the database instance may include identifying a subset of candidate database instances in the set of candidate database instances having a metric that is higher than the remaining candidate database instances in the set of candidate database instances and randomly selecting a candidate database instance in the subset of candidate database instances as the selected database instance. Each dataset metric in the set of dataset metrics may be calculated based on a set of response times for the set of queries in the plurality of queries for data from the dataset previously processed by the associated candidate database instance.

In some embodiments, the query may be a first query for data from a first dataset, the set of candidate database instances may be a first set of candidate database instances, the database instance may be a first database instance, and the plurality of queries may be a first plurality of queries. The method may further receive a second query for data from a second dataset stored in at least one database instance in the plurality of database instances. The method may also determine a second set of candidate database instances in the plurality of database instances that stores the second dataset. The method may further select a second database instance in the second set of candidate database instances based on the set of metrics associated with the second set of candidate database instances. The method may also process the second query using the selected, second database instance.

In some embodiments, the method may further determine information associated with the processing of the query. The method may also store the information for later retrieval in the processing of additional queries for data from the dataset. The plurality of queries for data from the dataset may be previously processed by the set of candidate database instances within a defined interval of time.

In some embodiments, a first computing system includes a set of processing units and a non-transitory computer-readable medium that stores instructions. The instructions cause at least one processing unit to receive a query for data from a dataset stored in at least one database instance in a plurality of database instances. The instructions further cause at least one processing unit to determine a set of candidate database instances in the plurality of database instances that stores the dataset. The instructions also cause at least one processing unit to select a database instance in the set of candidate database instances based on a set of metrics associated with the set of candidate database instances. The instructions further cause at least one processing unit to process the query using the selected database instance.

In some embodiments the set of metrics may include resource usage of the set of candidate database instances and a set of dataset metric based on a plurality of queries for data from the dataset previously processed by the set of candidate database instances. Selecting the database instance may include identifying a subset of candidate database instances in the set of candidate database instances having a metric that is higher than the remaining candidate database instances in the set of candidate database instances and randomly selecting a candidate database instance in the subset of candidate database instances as the selected database instance. Each dataset metric in the set of dataset metrics may be calculated based on a set of response times for the set of queries in the plurality of queries for data from the dataset previously processed by the associated candidate database instance.

In some embodiments, the query may be a first query for data from a first dataset, the set of candidate database instances may be a first set of candidate database instances, the database instance may be a first database instance, the plurality of queries may be a first plurality of queries. The instructions may further cause the at least one processing unit to receive a second query for data from a second dataset stored in at least one database instance in the plurality of database instances. The instructions may also cause the at least one processing unit to determine a second set of candidate database instances in the plurality of database instances that stores the second dataset. The instructions may further cause the at least one processing unit to select a second database instance in the second set of candidate database instances based on the set of metrics associated with the second set of candidate database instances. The instructions may also cause the at least one processing unit to process the second query using the selected, second database instance. The instructions may further cause the at least one processing unit to determine information associated with the processing of the query. The instructions may also cause the at least one processing unit to store the information for later retrieval in the processing of additional queries for data from the dataset.

The following detailed description and accompanying drawings provide a better understanding of the nature and advantages of the present invention.

DETAILED DESCRIPTION

Figure 1:
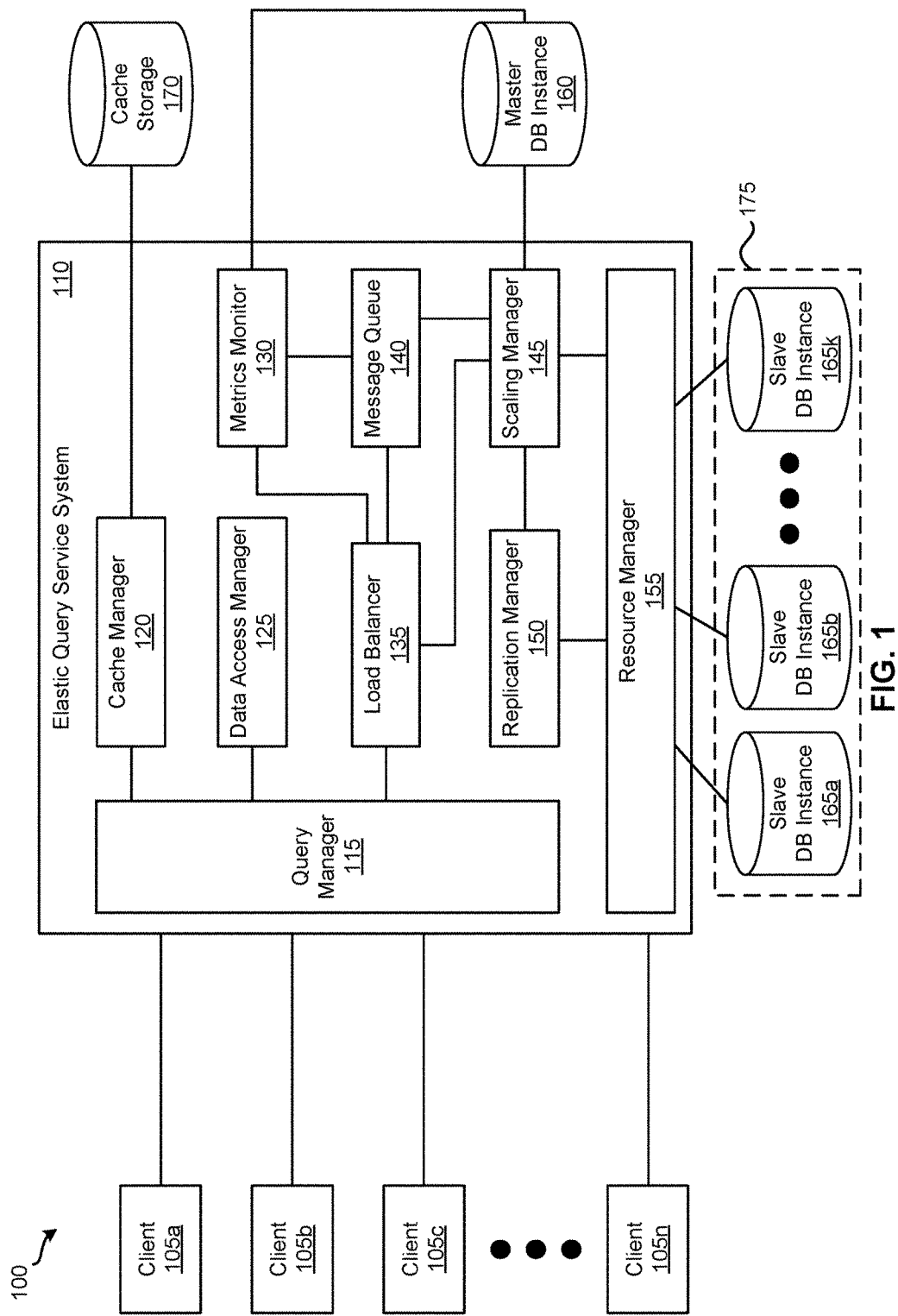
FIG. 1 illustrates a system that includes an elastic query service system according to some embodiments.

In the following description, for purposes of explanation, numerous examples and specific details are set forth in order to provide a thorough understanding of the present invention. It will be evident, however, to one skilled in the art that the present invention as defined by the claims may include some or all of the features in these examples alone or in combination with other features described below, and may further include modifications and equivalents of the features and concepts described herein.

Described herein are techniques for scaling database instances for a system that processes queries for data stored in the database instances. In some embodiments, the system monitors metrics associated with datasets from which data is queried. Based on the monitored metrics, the system may replicate datasets from a master database instance to one or more slave database instances. In some embodiments, when the system replicates a dataset, the system scales up the number of database instances used to process queries by adding a slave database instance from a resource pool of available database instances to a group of eligible database instances, which includes the master database instance, and replicating the dataset from the master database instance to the slave database instance. In addition, the system may remove one or more datasets from one or more slave database instances based on the monitored metrics (e.g., when a dataset is not used often). The system can also scale down the number of database instances used to process queries by removing one or more slave database instances from the group of eligible database instances and adding it back into the resource pool of available DB instances.

In some embodiments, upon receiving a query for data from a dataset, the system can select a database instance from the group of eligible database instances to process the query. The system may select the database instance by determining a set of candidate database instances in the group of eligible database instances that stores the dataset. That is, each candidate database instance in the set of candidate database instances stores the dataset. Then the system can select a database instance in the set of candidate database instances based on various different metrics. The metrics may include metrics associated with queries for data from the dataset that were previously processed by the set of candidate database instances, the current resource usage of each of the candidate database instances, etc. Once the system selects the database instance, the system processes the query using the selected database instance.

In some embodiments a dataset is defined as one or more tables in a database. In other embodiments, a dataset is defined as one or more tables and one or more views. In some instances, a view can be a filter associated with one or more tables that provides access to one or more attributes (e.g., columns) of the one or more tables and/or data calculated based on or derived from one or more attributes of the one or more tables. In some such instances, a view can filter one or more tables in order to provide access to a subset of the attributes of the one or more tables or all of the attributes of the one or more tables. In other instances, a view can be a filter associated with one or more views and/or tables that provides access to one or more attributes of the one or more views and/or tables.

FIG. 1 illustrates a system 100 that includes an elastic query service system according to some embodiments. As shown, system 100 includes clients 105a-n, elastic query service (EQS) system 110, master database (DB) instance 160, cache storage 170, and resource pool 175 that includes slave DB instances 165a-k. Clients 105a-n are each configured to access and communicate with EQS system 110 (e.g., via a network). For instance, a client 105 may send EQS system 110 a request for data from one or more datasets managed by EQS system 110. The request may be in the form of a query (e.g., a structured query language (SQL) query). In response to the request, the client 105 may receive results for the query from EQS system 110. Each of clients 105a-n may be an application (e.g., a mobile application, a standalone application, a web browser, a cloud computing application, etc.), a computing device, a mobile device, a server computer, a web service, etc. or any other type of client configured to request data from EQS system 110.

As illustrated in FIG. 1, EQS system 110 includes query manager 115, cache manager 120, data access manager 125, metrics monitor 130, load balancer 135, message queue 140, scaling manager 145, replication manager 150, and resource manager 155. Query manager 115 is configured to manage the processing of queries received from clients 105a-n. When query manager 115 receives a query from a client 105, query manager 115 identifies a set of datasets specified in the query that are stored in master DB instance 160. In some embodiments, the query includes user context information that includes a user (e.g., a user ID) that initiated the query. Query manager 115 then sends the identified set of datasets and user context information to data access manager 125. Next, query manager 115 receives from data access manager 125 a filter for the query. Query manager 115 modifies the query by applying the filter to the query.

After modifying the query, query manager 115 generates a cache key based on the modified query. In some embodiments, query manager 115 generates the cache key using a hash function on the modified query. Query manager 115 then sends the cache key to cache manager 120. Next, query manager 115 receives a response from cache manager 120. If the response from cache manager 120 indicates a cache miss, query manager 115 sends load balancer 135 the identified set of datasets and the modified query. Query manager 115 may then receive results for the query from load balancer 135. Once query manager 115 receives the results for the query, query manager 115 sends cache manager 120 the generated cache key and the results for the query. Query manager 115 then sends the results for the query to the client 105.

If the response from cache manager 120 indicates a cache hit, the response includes results for the query and a timestamp associated with the results for the query. In some embodiments, query manager 115 tracks the latest changes to the datasets stored in master DB instance 160 by maintaining a timestamp of the latest change to each dataset. Thus, when query manager 115 receives a cache hit, query manager 115 compares the timestamp included in the response from cache manager 120 and the timestamp of latest changes to the dataset. If timestamp included in the response is later than the timestamp of the latest changes to the dataset, query manager 115 query manager 115 forwards the results to the client 105. Otherwise, query manager 115 sends the identified datasets and the modified query to load balancer 135 for processing in the same manner explained above. Query manager 115 also sends cache manager 120 a message indicating that the results associated with the cache key are invalid.

Cache manager 120 handles the management of the caching of results of queries. When cache manager 120 receives a cache key generated from a query and results for the query from query manager 115, cache manager 120 stores the results in cache storage 170 based on the cache key along with a timestamp of the current time. Cache manager 120 stores the results of different queries in different areas (e.g., rows) of cache storage 170 based on the cache keys generated based on the different queries. This way, when cache manager 120 receives from query manager 115 a cache key generated from a query, cache manager 120 can use the cache key to retrieve the corresponding results for the query from cache storage 170. If cache storage 170 includes the corresponding results (e.g., a cache hit), cache manager 120 returns the results and the corresponding timestamp to query manager 115. If cache storage 170 does not include the corresponding results (e.g., a cache miss), cache manager 120 sends query manager 115 a message indicating so. Cache manager 120 may receive a message from query manager 115 indicating that results associated with a cache key are invalid. In response to such a message, cache manager 120 deletes the results associated with the cache key from cache storage 170.

Data access manager 125 manages access to datasets based on defined user contexts (e.g., based on user IDs). A data access definition may specify a subset of data in each dataset stored in master DB instance 160. As mentioned above, user context information may include a user (e.g., a user ID) that initiated a query. A data access associated with a user restricts the data that the user may access to the data specified by the definition of the data access. Different data access can be defined to restrict a user to different subsets of data in a dataset. For example, a dataset may include data associated with North America, data associated with Europe, and data associated with Asia. The definition of a first data access may specify data in the dataset associated with North America, the definition of a second data access may specify data in the dataset associated with Europe, the definition of a third data access may specify data in the dataset associated with North America and Asia, the definition of a fourth data access may specify data in the dataset associated with North America, Europe, and Asia, etc. Thus, a user may be allowed to access different data in the dataset in this example based on the data access associated with the user.

When data access manager 125 receives a set of datasets and user context information from query manager 115, data access manager 125 generates a set of filters for the set of datasets that restricts the data that the user may access to the data specified by the definition of the data access associated with the user. Once generated, data access manager 125 sends the set of filters to query manager 115.

Metrics monitor 130 is configured to monitor query information associated with the processing of queries. For example, metrics monitor 130 may retrieve from load balancer 135, via message queue 140, query information associated with the processing of a query. In some embodiments, the query information includes a set of datasets (e.g., a set of dataset identifiers (IDs) for identifying the set of datasets) specified in the query, the DB instance (e.g., a DB instance identifier (ID) for identifying the DB instance and/or a hostname of the DB instance) used to process the query, a response time associated with the processing of the query, and a timestamp indicating a time at which the query is processed. One of ordinary skill in the art will appreciate that additional and/or different information may be included in the query information associated with the processing of a query. For instance, the query information may also include a partition identifier (ID) for identifying a partition on which the set of datasets are stored. Metrics monitor 130 stores the query information for later retrieval and/or analysis.

Metrics monitor 130 is also be configured to monitor metrics associated with master DB instance 160 and slave DB instances 165a-k. For example, metrics monitor 130 may monitor resource usage (e.g., memory usage, central processing unit (CPU) usage, etc.) of master DB instance 160 and slave DB instances 165a-k. Metrics monitor 130 polls the resource usage of master DB instance 160 and slave DB instances 165a-k at defined intervals (e.g., once per second, once per thirty seconds, once per minute, once per five minutes, etc.) and stores the received resource usage information.

In some cases, metrics monitor 130 may receive a request from load balancer 135 for metrics associated with a set of datasets and a set of DB instances (e.g., master DB instance 160 and/or one or more slave DB instances 165). Metrics monitor 130 sends load balancer the resource usage (e.g., memory usage, CPU usage, etc.) of each DB instance in the set of DB instances and a dataset metric for the set of datasets stored in each DB instance in the set of DB instances. In some embodiments, metrics monitor 130 determines a dataset metric for a set of datasets stored in a DB instance by retrieving the response times of previously processed queries that specifies the set of datasets, calculating an average of such response times, and multiplying the calculated average by the number (also referred to as the frequency) of previously processed queries that specifies the set of datasets. The average response time may be calculated according to the following equation (1):

$$R_{ds} = \frac{\sum_{i=1}^{n} R_{Q_i}}{n}$$

where $R_{Q_i}$ is the response time for processing query i that specifies the set of datasets and n is the number of queries that specify the set of datasets. In some such embodiments, previously processed queries are queries that have been processed within a defined interval (e.g., queries that have been processed within the last hour, queries that have been processed within the last day, queries that have been processed within the last five days, queries that have been processed within the last week, etc.).

Metrics monitor 130 is responsible for sending messages to scaling manager 145 via message queue 140. When metrics monitor 130 sends a message, metrics monitor 130 sends it to message queue 140 for scaling manager 145 to retrieve. In some embodiments, metrics monitor 130 may send scaling manager 145 a message indicating that one or more datasets are overloading a DB instance based on a different factors. For instance, when the average response time, as explained above, for a dataset stored in a DB instance exceeds a defined threshold value, metrics monitor 130 may send a message to scaling manager 145 indicating that the dataset is overloading the DB instance. As another example, when the memory usage of a DB instance exceeds a defined threshold percentage (e.g., 70%, 75%, 80%, etc.), metrics monitor 130 may send a message to scaling manager 145 indicating that the datasets stored on the DB instance are overloading the DB instance. As yet another example, when the CPU usage of a DB instance exceeds a defined threshold percentage (e.g., 60%, 65%, 70%, etc.), metrics monitor 130 may send a message to scaling manager 145 indicating that the datasets stored on the DB instance are overloading the DB instance.

In some embodiments, metrics monitor 130 can send scaling manager 145 a message indicating that one or more datasets are underutilized based on a different factors. For example, metrics monitor 130 may send a message to scaling manager 145 indicating that a dataset is underutilized when the average response times, as described above, associated with each DB instance on which the dataset is stored falls below a defined threshold value. As another example, metrics monitor 130 may send a message to scaling manager 145 indicating that the datasets stored on a DB instance are underutilized when the memory usage of the DB instance falls under a defined threshold percentage (e.g., 20%, 25%, 30%, etc.). As yet another example, metrics monitor 130 may send a message to scaling manager 145 indicating that the datasets stored in a DB instance are underutilized when the CPU usage of the DB instance falls under a defined threshold percentage (e.g., 10%, 15%, 20%, etc.).

Load balancer 135 is responsible for managing the distribution of the processing of queries among a group of eligible DB instances. In some embodiments, an eligible DB instance is a DB instance that may be selected by load balancer 135 to process a query. In this example, the group of eligible DB instance includes master DB instance 160. Load balancer 135 can receive from query manager 115 a query to process and a set of datasets specified in the query. Load balancer 135 determines a set of candidate DB instances in a group of eligible DB instances that stores the set of datasets. Load balancer 135 then sends metrics monitor 130 a request for metrics associated with the set of datasets and the set of candidate DB instances. Next, load balancer 135 selects a DB instance in the set of candidate DB instances based on the metrics received from metrics monitor 130. In instances where the group of eligible DB instances includes just master DB instance 160, load balancer 135 selects master DB instance 160. In other instances where the group of eligible DB instances includes master DB instance 160 and one or more slave DB instances 165, load balancer 135 selects master DB instance 160 or one of the slave DB instances 165 based on the metrics associated with master DB instance 160 and the one or more slave DB instances 165.

Once a DB instance is selected, load balancer 135 sends the query to the selected DB instance to process the query. Load balancer 135 receives, in return, results for the query from the selected DB instance along with metrics associated with the processing of the query by the selected DB instance. In some embodiments, the metrics include a response time that represents an amount of time (e.g., milliseconds, seconds, minutes, etc.) that elapsed between the time at which load balancer 135 sends the query to the selected DB instance and the time at which load balancer 135 receives the results for the query from the selected DB instance. Load balancer 135 sends the results for the query to query manager 115. In addition, load balancer 135 sends query information associated with the processing of the query to message queue 140 for metrics monitor 130 to retrieve. In some embodiments, the query information includes a set of datasets specified in the query, the DB instance (e.g., a DB instance ID of the DB instance) used to process the query, and the response time associated with the processing of the query.

As described above, load balancer may determine a set of candidate DB instances in a group of eligible DB instances that stores a set of datasets. In some embodiments, load balancer 135 determines the set of candidate DB instances by sending scaling manager 145 a request for a list of the eligible DB instances and the datasets stored on each of the eligible DB instance. Load balancer 135 then identifies each DB instance in the group of eligible DB instances that stores the set of datasets specified in the query and includes them in the set of candidate DB instances. In other words, load balancer 135 does not include a particular DB instance in the group of DB instances in the set of candidate DB instances if the particular DB instance does not store the set of datasets specified in the query.

As explained above, load balancer 135 selects a DB instance in the set of candidate DB instances based on the metrics received from metrics monitor 130. In some embodiments, the metrics that load balancer 135 receives from metrics monitor 130 includes the resource usage (e.g., memory usage, CPU usage, etc.) of each DB instance in the set of DB instances and a dataset metric for the set of datasets stored in each DB instance in the set of DB instances, as mentioned above. Load balancer 135 may use any number of different techniques to select a DB instance from the set of candidate DB instances. For example, load balancer may calculate a score for each DB instance based on the metrics received from metrics monitor 130. In some embodiments, load balancer 135 uses the following equation (2) to calculate a score for a DB instance i:

$$\text{Score } (DB_i) = W_1 \times \alpha + W_2 \times \beta$$

where $W_1$ and $W_2$ are defined constants that satisfy $W_1+W_2=1$, $\alpha$=the percentage of CPU usage+the percentage of memory usage, and $\beta$=the dataset metric for the set of datasets stored in DB instance i (i.e., the average of the response times of previously processed queries that specifies the set of datasets multiplied by the frequency of previously processed queries that specifies the set of datasets). Once a score is calculated for each DB instance in the set of candidate DB instances, load balancer 135 determines a defined number (e.g., three, five, seven, etc.) of DB instances with the highest scores. Next, load balance 135 randomly selects a DB instance from the defined number of DB instances with the highest scores as the DB instance to use to process the query. Load balancer 135 then sends the query to the selected DB instance for processing.

Message queue 140 is configured to facilitate the communication of messages among metrics monitor 130, load balancer 135, and scaling manager 145. Message queue 140 includes a message queue for each unique pair of sender and receiver. Specifically, message queue 140 includes a message queue for messages sent from metrics monitor 130 and destined for load balancer 135, a message queue for messages sent from metrics monitor 130 and destined for scaling manager 145, a message queue for messages sent from load balancer 135 and destined for metrics monitor 130, a message queue for messages sent from load balancer 135 and destined for scaling manager 145, a message queue for messages sent from scaling manager 145 and destined for metrics monitor 130, and a message queue for messages sent from scaling manager 145 and destined for load balancer 135. When message queue 140 receives a message, message queue 140 identifies the sender of the message and the intended recipient of the message and places the message in the corresponding queue. This way, metrics monitor 130, load balancer 135, and scaling manager 145 may monitor their respective queues for which they are the intended recipients and retrieve any messages from the queues.

Scaling manager 145 manages the DB instances in the group of eligible DB instances (master DB instance 160 in this example). As mentioned above, an eligible DB instance is a DB instance that may be selected by load balancer 135 to process a query in some embodiments. In particular, scaling manager 145 tracks the DB instances in the group of eligible DB instances as well as the datasets stored in each DB instance in the group of eligible DB instances. In addition, scaling manager 145 monitors the resource usage (e.g., memory usage, CPU usage, etc.) of each DB instance in the group of eligible DB instances. In some embodiments, scaling manager 145 monitors the amount of memory used by each dataset on each DB instance. To monitor the resource usage of the DB instances, scaling manager 145 may poll the resource usage of each DB instance in the group of eligible DB instances at defined intervals (e.g., once per second, once per thirty seconds, once per minute, once per five minutes, etc.) and store the received resource usage information. Scaling manager 145 may receive a request from load balancer 135 for the DB instances in the group of eligible DB instances. In response, scaling manager 145 sends load balancer 135 a list of the DB instances in the group of eligible DB instances along with the datasets stored in each DB instance in the group of eligible DB instances.

Scaling manager 145 also manages the scaling of datasets as well as the scaling of the group of eligible DB instances. Scaling manager 145 listens to message queue 140 for messages from metrics monitor 130. When scaling manager 145 receives via message queue 140 a message from metrics monitor 130 indicating that one or more datasets are overloading a DB instance, scaling manager 145 determines the manner in which to scale up the one or more datasets. In some embodiments, scaling manager 145 identifies a set of slave DB instances 165 in the group of eligible DB instances that each have an amount of free storage space to store the one or more datasets. If no such slave DB instance 165 exists, scaling manager 145 scales up the group of eligible DB instances by adding a slave DB instance 165 to the group of eligible DB instances and replicating the one or more datasets from master DB instance 160 to newly added slave DB instance 165. Otherwise, scaling manager 145 uses the following equation (3) to calculate a score for each slave DB instance 165 in the identified set of slave DB instances 165:

$$\text{Score } (DB_i) = W_1 \times \alpha + W_2 \times \beta + W_2 \times \gamma$$

where $W_1$, $W_2$, and $W_3$ are defined constants that satisfy $W_1+W_2+W_3=1$, $\alpha$=the percentage of CPU usage, $\beta$=the percentage of memory usage, and $\gamma$=the dataset metric for the set of datasets stored in DB instance i (i.e., the average of the response times of previously processed queries that specifies the set of datasets multiplied by the frequency of previously processed queries that specifies the set of datasets). In other cases, scaling manager 145 uses the equation (2) mentioned above to calculate the score for each slave DB instance 165 in the identified set of slave DB instances 165. Scaling manager 145 then selects the slave DB instance 165 in the identified set of slave DB instances 165 that has the highest calculated score. If the calculated score of the selected slave DB instance 165 is lower than a defined threshold score, scaling manager 145 replicates the one or more datasets from master DB instance 160 to the selected slave DB instance 165. Otherwise, scaling manager 145 scales up the group of eligible DB instances by adding a slave DB instance 165 to the group of eligible DB instances and replicating the one or more datasets from master DB instance 160 to newly added slave DB instance 165.

If scaling manager 145 determines to scale up the group of eligible DB instances, scaling manager 145 sends resource manager 155 a request for an available slave DB instance 165 from resource pool 175. In return, scaling manager 145 receives a slave DB instance 165 (e.g., a DB instance ID of the slave DB instance 165) from resource manager 155 and adds the slave DB instance 165 to the group of eligible DB instances. To effectuate the replication of a set of datasets to a DB instance, scaling manager 145 sends replication manager 150 the DB instance (e.g., the DB instance ID of the DB instance), the set of datasets, and a request to replicate the set of datasets to the DB instance.

Scaling manager 145 may also receive via message queue 140 a message from metrics monitor 130 indicating that one or more datasets are underutilized. In such instances, scaling manager 145 determines the manner in which to scale down the one or more datasets from the DB instance. In some embodiments, scaling manager 145 identifies a set of slave DB instances 165 in the group of eligible DB instances that each stores the one or more datasets. Scaling manager 145 uses equation (3) to calculate a score for each slave DB instance 165 in the identified set of slave DB instances 165. In some instance, scaling manager 145 uses the equation (2) instead of equation (3). Scaling manager 145 then selects the slave DB instance 165 in the identified set of slave DB instances 165 that has the lowest calculated score and removes the one or more datasets from the selected DB slave instance 165.

Replication manager 150 handles the replication of datasets from master DB instance to slave DB instances 165a-k. For example, replication manager 150 may receive from scaling manager 145 a DB instance, a set of datasets, and a request to replicate the set of datasets to the DB instance. In response, replication manager 150 replicates the set of datasets from master DB instance 160 to the DB instance.

Resource manager 155 is configured to manage the resource pool 175 of available slave DB instances 165a-k. For instance, when resource manager 155 receives from scaling manager 145 a request for an available slave DB instance 165, resource manager 155 identifies a slave DB instance in resource pool 175, removes it from resource pool 175, and sends it to scaling manager 145. As another example, resource manager 155 may receive a slave DB instance 165 from scaling manager 145 that has been removed from the group of eligible DB instances. In response, resource manager 155 adds the slave DB instance 165 back to resource pool 175.

Master DB instance 160 is configured to store each dataset managed by EQS system 110. Slave DB instances 165a-k may be configured to store one or more datasets stored in master DB instance 160. For example, when scaling manager 145 scales up the group of eligible DB instances, scaling manager 145 receives a slave DB instance 165 in resource pool 175 from resource manager 155 and instructs replication manager 150 to replicate one or more datasets from master DB instance 160 to the slave DB instance 165. In some embodiments, each master DB instance 160 and slave DB instances 165a-k may be a computing system that include a database. In some such embodiments, the computing system may be a physical computing systems or a virtual computing systems. Cache storage 170 is configured to store results of query results and timestamps associated with the results. Master DB instance 160, slave DB instances 165a-k, and cache storage 170 are shown in FIG. 1 as external from EQS system 110. In some embodiments, some or all of master DB instance 160, slave DB instances 165a-k, and cache storage 170 may be included in EQS system 110.

Figure 2:
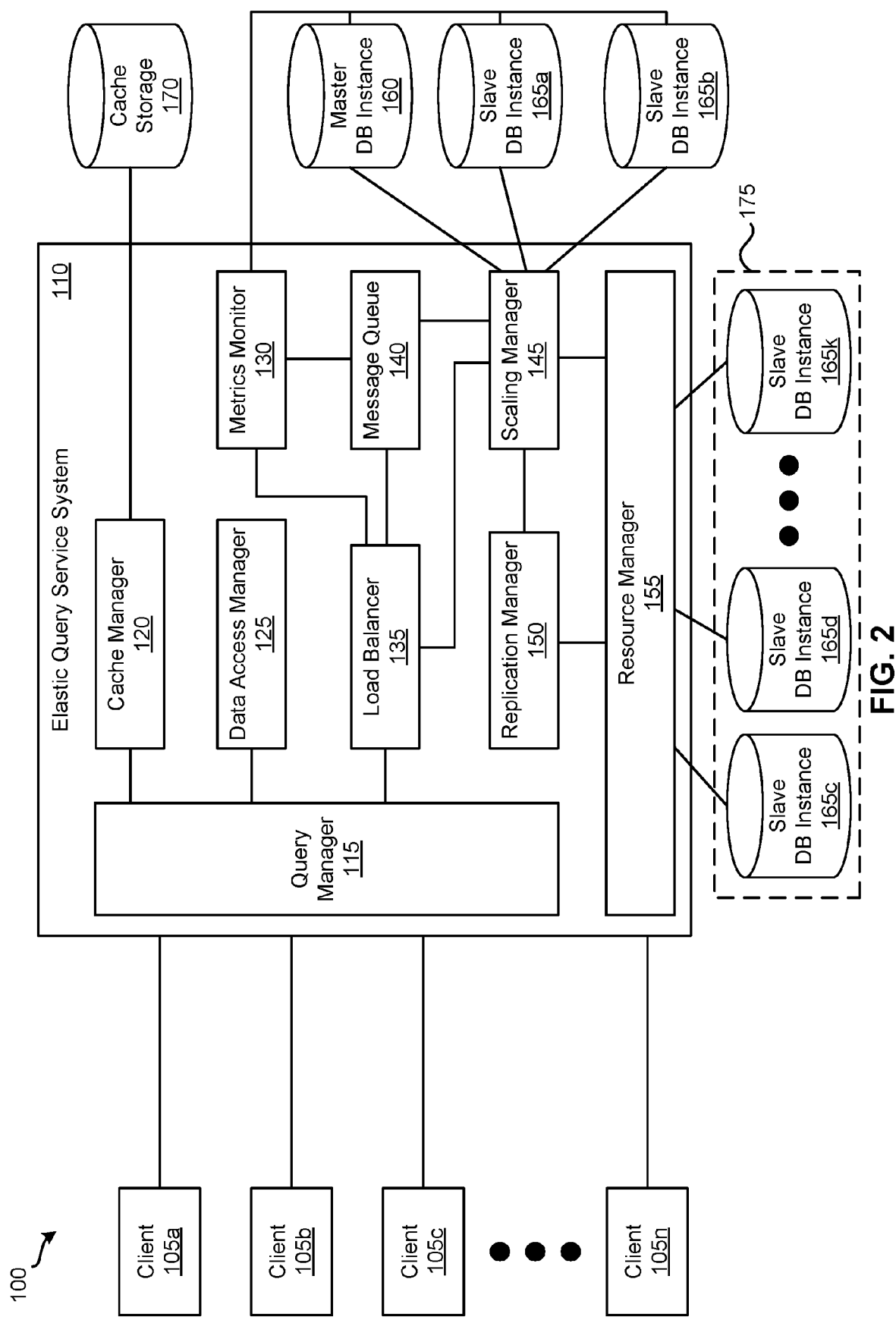
FIG. 2 illustrates the system illustrated in FIG. 1 after scaling up database instances according to some embodiments.

As described above, scaling manager 145 may scale up the group of eligible DB instances. FIG. 2 illustrates the system illustrated in FIG. 1 after scaling up database instances according to some embodiments. Specifically, scaling manager 145 scaled up the group of eligible DB instances to also include slave DB instance 165a and slave DB instance 165b. As shown, the group of eligible DB instances now includes master DB instance 160, slave DB instance i 65a, and slave DB instance 165b. As a result, resource pool 175 now includes slave DB instances 165c-k. One of ordinary skill in the art will understand that additional and/or different slave DB instances 165 may be added to the group of eligible DB instances when scaling up the group of eligible DB instances.

Figure 3:
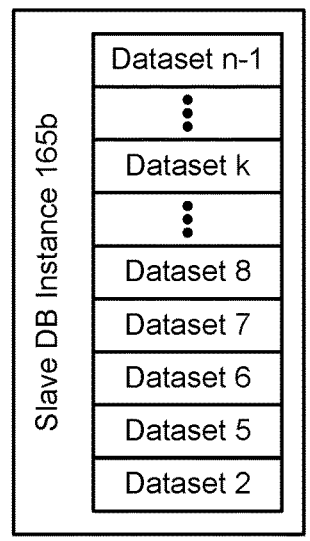
FIG. 3 illustrates an example of datasets stored in the master and slave database instances illustrated in FIG. 2 according to some embodiments.
Figure 3:
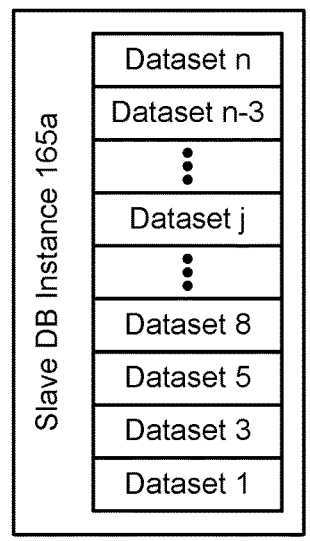
Figure 3:
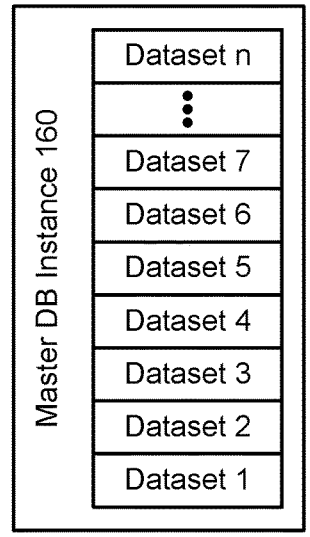

As explained above, scaling manager 145 also manages the scaling of datasets. In some embodiments, scaling manager 145 may determine to scale up one or more datasets by scaling up the group of eligible DB instances, determine to scale up the one or more datasets by replicating the one or more datasets from master DB instance 160 to a slave DB instance 165 that is already in the group of eligible DB instances, or a combination thereof. Accordingly, different slave DB instances 165 may store different datasets stored in master DB instance 160. FIG. 3 illustrates an example of datasets stored in the master and slave database instances illustrated in FIG. 2 according to some embodiments. As shown, master DB instance 160 stores datasets 1-n while slave DB instances 165a and 165b store different subsets of datasets 1-n. In particular, slave DB instance 165a stores dataset 1, dataset 3, dataset 5, dataset 8, . . . , dataset j . . . , dataset n-3, and dataset n while slave DB instance 165b stores dataset 2, datasets 5-8, . . . , dataset k, . . . , and dataset n-1. One of ordinary skill in the art will realize that additional and/or different datasets stored in master DB instance 160 may be replicated to slave DB instances 165a and 165b.

Figure 4:
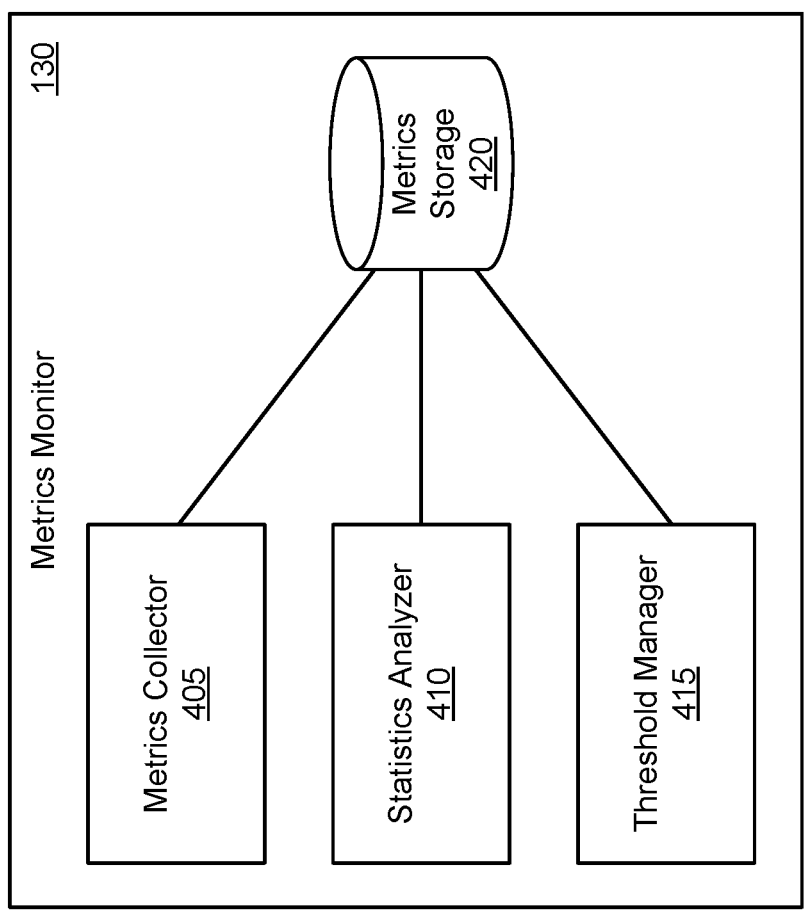
FIG. 4 illustrates a metrics manager according to some embodiments.

FIG. 4 illustrates metrics monitor 130 according to some embodiments. As shown, metrics monitor 130 includes metrics collector 405, statistics analyzer 410, threshold manager 415, and metrics storage 420. Metrics storage 420 is configured to store metrics associated with the processing of queries, datasets and DB instances.

Metrics collector 405 is responsible for collecting a variety of different metrics. For example, metrics collector 405 monitors and collects query information associated with the processing of queries. Metrics collector 405 may retrieve, via message queue 140, query information associated with the processing of a query from load balancer 135. As mentioned above, query information may include a set of datasets (e.g., a set of dataset IDs) specified in the query, the DB instance (e.g., a DB instance ID and/or a hostname of the DB instance) used to process the query, a response time associated with the processing of the query, a timestamp indicating a time at which the query is processed, etc. When metrics collector 405 receives such query information, metrics collector 405 stores it in metrics storage 420. In addition, metrics collector 405 monitors metrics associated with master DB instance 160 and slave DB instances 165a-k. For instance, metrics collector 405 may monitor resource usage (e.g., memory usage, central processing unit (CPU) usage, etc.) of master DB instance 160 and slave DB instances 165a-k. In some embodiments, metrics collector 405 polls master DB instance 160 and slave DB instances 165a-k for their resource usage at defined intervals (e.g., once per second, once per thirty seconds, once per minute, once per five minutes, etc.) and stores the received resource usage information in metrics storage 420.

Statistics analyzer 410 handles requests from load balancer 135 for metrics. For instance, statistics analyzer 410 can receive a request from load balancer 135 for metrics associated with a set of datasets and a set of DB instances (e.g., master DB instance 160 and/or one or more slave DB instances 165). In response, statistics analyzer 410 retrieves resource usage (e.g., memory usage, CPU usage, etc.) information of each DB instance in the set of DB instances from metrics storage 420 and sends it to load balancer 135. Also in response, statistics analyzer 410 determines a dataset metric for the set of datasets stored in each DB instance in the set of DB instances based on query information that statistics analyzer 410 retrieves from metrics storage 420 and sends the determined dataset metrics to load balancer 135.

Threshold manager 415 is configured to send different messages to scaling manager 145 via message queue 140 based on different metrics and defined thresholds. For example, when the average response time for a dataset stored in a DB instance exceeds a defined threshold value, threshold manager 415 may send a message to scaling manager 145 indicating that the dataset is overloading the DB instance. As another example, when the memory usage of a DB instance exceeds a defined threshold percentage (e.g., 70%, 75%, 80%, etc.), threshold manager 415 may send a message to scaling manager 145 indicating that the datasets stored on the DB instance are overloading the DB instance. As yet another example, when the CPU usage of a DB instance exceeds a defined threshold percentage (e.g., 60%, 65%, 70%, etc.), threshold manager 415 may send a message to scaling manager 145 indicating that the datasets stored on the DB instance are overloading the DB instance. As another example, threshold manager 415 may send a message to scaling manager 145 indicating that a dataset is underutilized when the average response times associated with DB instances on which the dataset is stored falls below a defined threshold value. As another example, threshold manager 415 may send a message to scaling manager 145 indicating that the datasets stored on a DB instance are underutilized when the memory usage of the DB instance falls under a defined threshold percentage (e.g., 20%, 25%, 30%, etc.). As yet another example, threshold manager 415 may send a message to scaling manager 145 indicating that the datasets stored in a DB instance are underutilized when the CPU usage of the DB instance falls under a defined threshold percentage (e.g., 10%, 15%, 20%, etc.).

Figure 5:
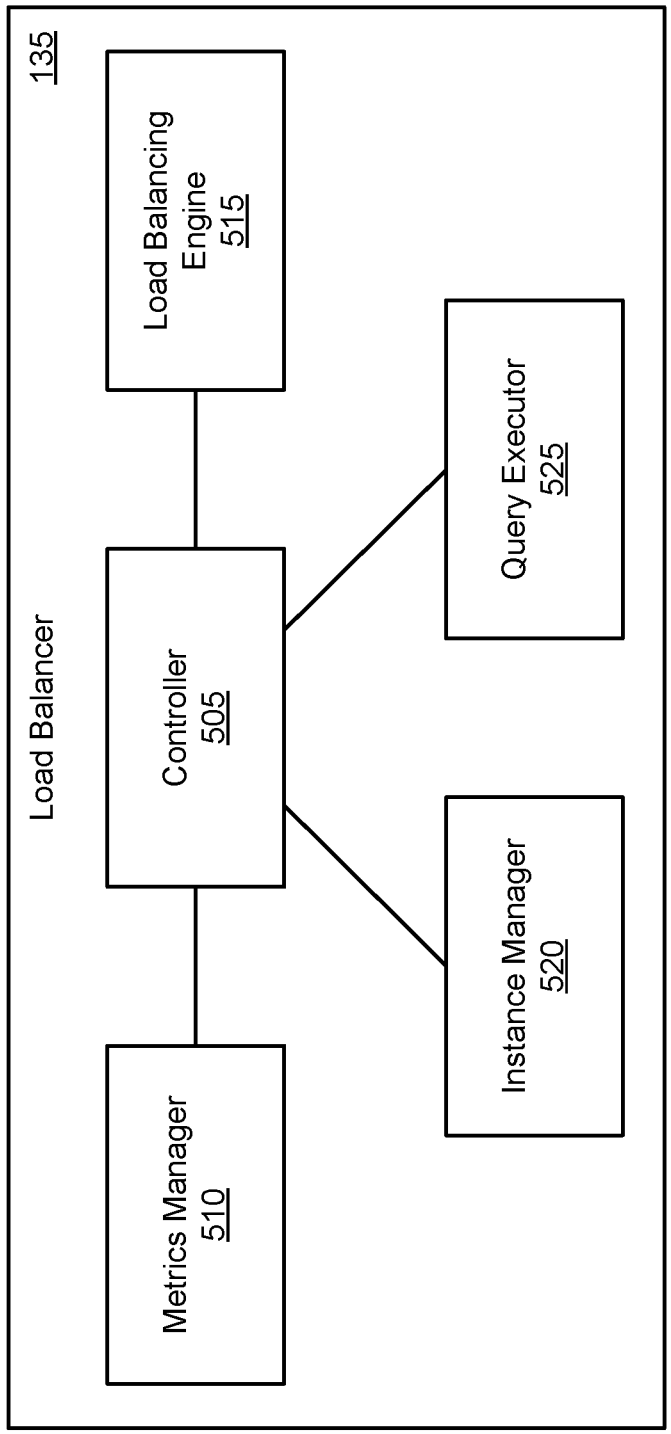
FIG. 5 illustrates a load balancer according to some embodiments.

FIG. 5 illustrates load balancer 135 according to some embodiments. As shown, load balancer 135 includes controller 505, metrics manager 510, load balancing engine 515, instance manager 520, and query executor 525. Controller 505 is configured to manage the processing of a query. When controller 505 receives from query manager 115 a query to process and a set of datasets specified in the query, controller 505 sends instance manager 520 a request to determine a set of candidate DB instances in the group of eligible DB instances based on the set of datasets. Once controller 505 receives the set of candidate DB instances from instance manager 520, controller 505 requests metrics manager 510 to retrieve metrics associated with the set of datasets and the set of candidate DB instances. Upon receiving such metrics, controller 505 sends the metrics to load balancing engine 515 and request load balancing engine 515 to select a DB instance in the set of candidate DB instance. When controller 505 receives the selected DB instance from load balancing engine 515, controller 505 sends query executory 525 the selected DB instance and the query for processing. In response, controller 505 receives from query executory 525 results for the query as well as metrics associated with the processing of the query by the selected DB instance. Controller 505 sends the results for the query to query manager 115 and sends the metrics to metrics manager 510.

Metrics manager 510 is configured to send and receive metrics to/from metrics monitor 130. For instance, when metrics manager 510 receives a request for metrics associated with a set of datasets and a set of candidate DB instances, metrics manager 510 forwards the request to metrics monitor 130 via message queue 140. Upon retrieving the requested metrics from message queue 140, metrics manager 510 forwards the metrics to controller 505. If metrics manager 510 receives from controller 505 metrics associated with the processing of a query by a DB instance, metrics manager 510 sends the metrics to metrics monitor 130 via message queue 140.

Load balancing engine 515 is responsible for determining a DB instance to process a query. When load balancing engine 515 receives a request from controller 505 to select a DB instance in a set of candidate DB instance, metrics associated with the set of candidate DB instances, and dataset metrics associated with datasets, load balancing engine 515 may calculate a score for each DB instance based on the metrics received from metrics manager 130. In some embodiments, load balancing engine 515 uses the equation described above to calculate a score for a DB instance i. From the calculated scores, load balancing engine 515 determines a defined number (e.g., three, five, seven, etc.) of DB instances with the highest scores. Load balancing engine 515 then randomly selects a DB instance from the defined number of DB instances with the highest scores as the DB instance to use to process the query. Load balancing engine 515 sends the selected DB to controller 505.

Instance manager 520 is configured to determine candidate DB instances in the group of eligible DB instances. When instance manager 520 receives from controller 505 a request to determine a set of candidate DB instances in the group of eligible DB instances based on a set of datasets, instance manager 520 sends scaling manager 145 a request for a list of the eligible DB instances and the datasets stored on each of the eligible DB instance. Instance manager 520 then identifies each DB instance in the group of eligible DB instances that stores the set of datasets and includes them in the set of candidate DB instances. Instance manager 520 then sends controller 505 the identified DB instances as the set of candidate DB instances.

Query executor 525 handles the execution of queries on DB instances. For example, when query executory 525 receives a DB instance and a query from controller 505, query executor 525 sends the query to the DB instance and requests the DB instance to execute the query. In response, query executor 525 receives from the DB instance results for the query and metrics associated with the processing of the query by the selected DB instance. Query executor 525 sends the results for the query and metrics to controller 505.

Figure 6:
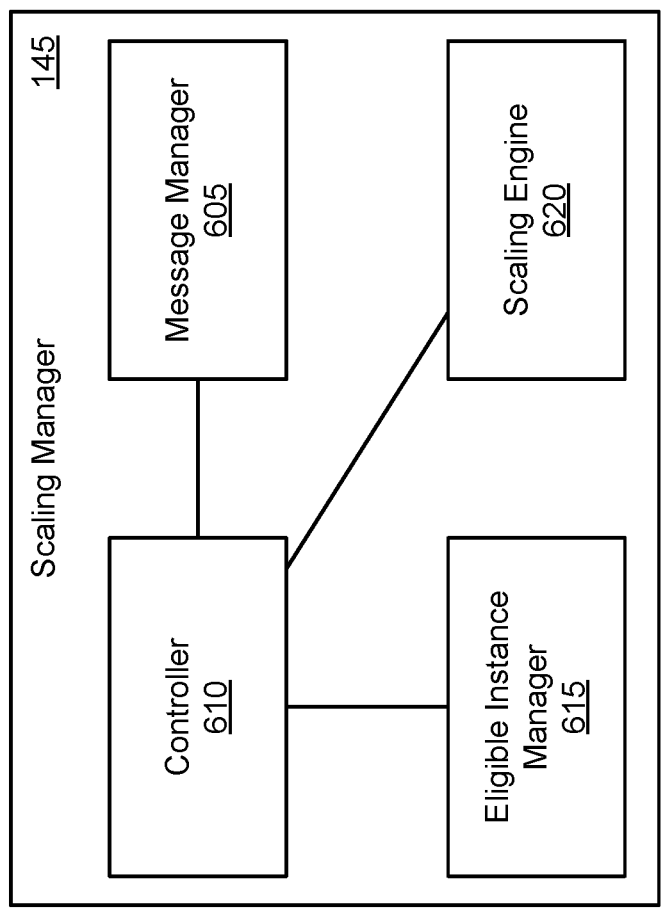
FIG. 6 illustrates a scaling manager according to some embodiments.

FIG. 6 illustrates scaling manager 145 according to some embodiments. As shown, scaling manager 145 includes message manager 605, controller 610, eligible instance manager 615, and scaling engine 620. Message manager 605 is configured to monitor for messages from metrics monitor 130. In this example, message manager 605 monitors for such messages by listening for messages from metrics monitor 130 in the corresponding queue in message queue 140. When a message is retrieved, message manager 605 sends the message to controller 610.

Controller 610 manages the scaling of datasets and DB instances. When controller 610 receives a message from message manager 605 indicating that one or more datasets are overloading a DB instance or are underutilized on a DB instance, controller 610 sends the message to scaling engine 620. Controller 610 may also handle requests from load balancer 135. For instance, controller 610 may receive a request from load balancer 135 for a list of the DB instances in the group of eligible DB instances. In response to such a request, controller 610 sends eligible instance manager 615 a request for the list of DB instances in the group of eligible DB instances and the datasets stored in each DB instance. When controller 610 receives the list of the DB instances and the datasets stored in each DB instance, controller 610 forwards the information to load balancer 135.

Eligible instance manager 615 is responsible for tracking DB instances in the group of eligible DB instances and the datasets stored in each DB instance in the group of eligible DB instances. For example, eligible instance manager 615 monitors the resource usage (e.g., memory usage, CPU usage, etc.) of each DB instance in the group of eligible DB instances. As another example, eligible instance manager 615 may monitor the amount of memory used by each dataset on each DB instance. To monitor the resource usage of the DB instances, eligible instance manager 615 can poll each DB instance in the group of eligible DB instances at defined intervals (e.g., once per second, once per thirty seconds, once per minute, once per five minutes, etc.) for their resource usage and store the received resource usage information.

Scaling engine 620 is configured to perform scaling operations in response to messages received from controller 610. For example, when scaling engine 620 receives a message indicating that one or more datasets are overloading a DB instance, scaling engine 620 determines the manner in which to scale up the one or more datasets. In some cases, scaling engine 620 determines to scale up the one or more datasets via scaling up the group of eligible DB instances and replicating the one or more datasets from master DB instance 160 to a newly added slave DB instance 165. In other cases, scaling manager 145 determines to scale up the one or more datasets by replicating the one or more datasets from master DB instance 160 to a slave DB instance 165 that is already in the group of eligible DB instances. In yet other cases, scaling engine 620 determines to scale up the one or more datasets by replacing the one or more datasets using a combination of the two aforementioned methods.

When scaling engine 620 receives a message from controller 610 indicating that one or more datasets are underutilized on a DB instance, scaling engine 620 determines the manner in which to scale down the one or more datasets from the DB instance. In some cases, scaling engine 620 determines to scale down the one or more datasets from the DB instance by removing the one or more datasets from the DB instance. In other cases, scaling manager 145 also removes the DB instance from the group of eligible DB instances and returns the DB instance to resource pool 175.

In instances where scaling engine 620 determines to scale up the group of eligible DB instances, scaling engine 620 may send resource manager 155 a request for an available slave DB instance 165 from resource pool 175. Scaling engine 620 may receive, in return, a slave DB instance 165 (e.g., a DB instance ID of the slave DB instance 165) from resource manager 155. Scaling engine 620 then adds the slave DB instance 165 to the group of eligible DB instances.

To effectuate the replication of a set of datasets to a DB instance, scaling engine 620 sends replication manager 150 the DB instance (e.g., the DB instance ID of the DB instance), the set of datasets, and a request to replicate the set of datasets to the DB instance.

Figure 7:
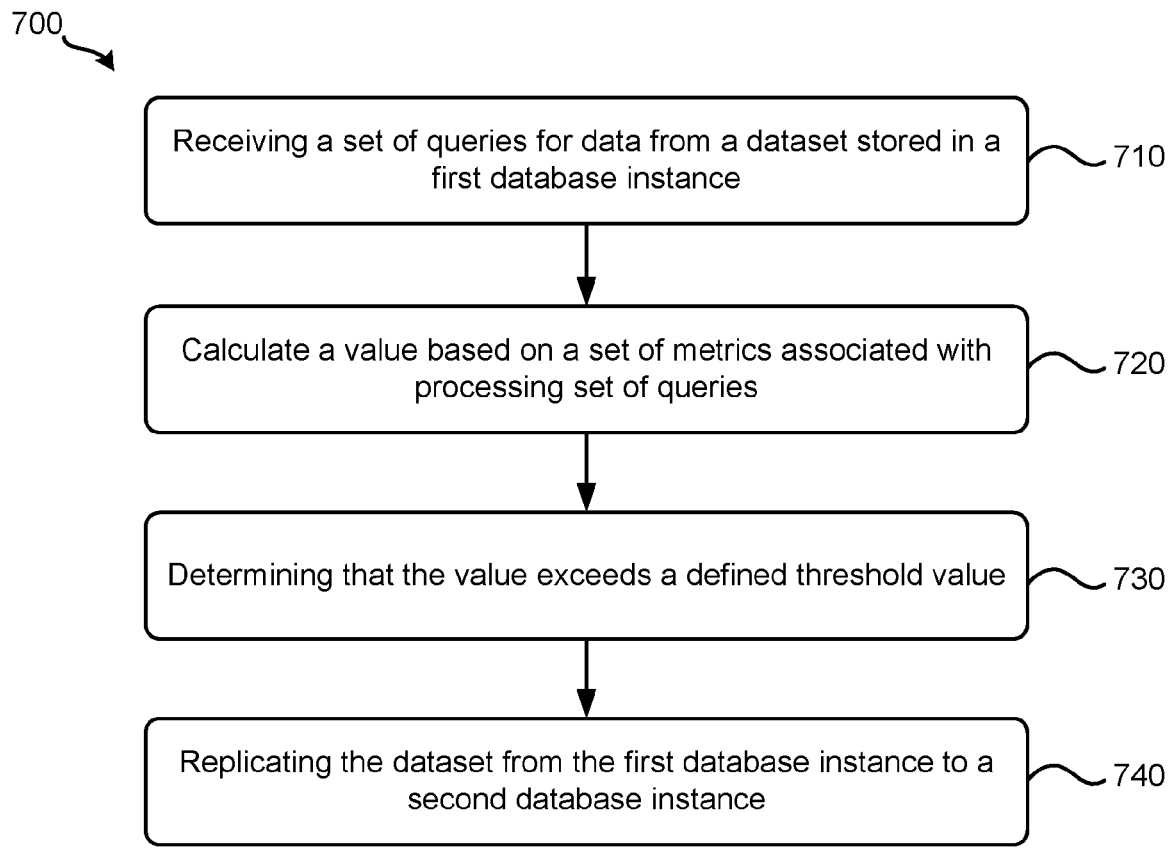
FIG. 7 illustrates a process for scaling up a dataset according to some embodiments.

FIG. 7 illustrates a process 700 for scaling up a dataset according to some embodiments. In some embodiments, EQS system 110 performs process 700. Process 700 starts by receiving, at 710, a set of queries for data from a dataset in a first database instance. Referring to FIG. 1 as an example, query manager 115 may perform operation 710 and the first database instance may be master DB instance 160. After receiving the set of queries, process 700 may send the set of queries to load balancer 135 for processing. As explained above, when load balancer 135 selects a DB instance to process a query and sends the query to the selected DB instance, load balance 135 may receive metrics associated with the processing of the query by the selected DB instance. In some embodiments, the metrics include a response time that represents an amount of time (e.g., milliseconds, seconds, minutes, etc.) that elapsed between the time at which load balancer 135 sends the query to the selected DB instance and the time at which load balancer 135 receives the results for the query from the selected DB instance. Load balancer 135 sends metrics monitor 130 query information associated with the processing of the query, which may include a set of datasets specified in the query, the DB instance (e.g., a DB instance ID of the DB instance) used to process the query, and the response time associated with the processing of the query.

Next, process 700 calculates, at 720, a value based on a set of metrics associated with processing the set of queries. Referring to FIG. 1 as an example, metrics monitor 130 may perform operation 720. In some embodiments, the value that process 700 calculates is the average response time for processing the set of queries. The calculation of such a value is described above. Process 700 then determines, at 730, that the value exceeds a defined threshold value. Referring to FIG. 1 as an example, metrics monitor 130 may perform operation 730. In response to the determination, process 700 may send a message to scaling manager 145 via message queue 140 indicating that the dataset is overloading the first database instance. Scaling manager 145 may then determine the manner in which to scale up the dataset. In this example, scaling manager 145 determines to scale up the dataset by scaling up the group of eligible DB instances and replicating the dataset to the newly added DB instance in the group of eligible DB instances.

Finally, process 700 replicates, at 740, the dataset from the first database instance to a second database instance. Referring to FIGS. 1 and 2 as an example, replication manager 150 may perform operation 740 and the second database instance may be slave DB instance 165a or slave DB instance 165b shown in FIG. 2. Once the dataset is replicated from the first database instance to the second database instance, load balancer 145 may select a database instance from at least the first and second database instances to process a query that specifies the dataset. FIG. 7 illustrates an example of scaling up a dataset when an average response time for processing queries that specifies a dataset exceeds a defined threshold value. One of ordinary skill in the art will appreciate that the same or similar technique may be used to scale up a dataset when different metrics exceed different threshold values. For example, such a technique can be used when the memory usage of a DB instance exceeds a defined threshold percentage or when the CPU usage of a DB instance exceeds a defined threshold percentage.

Figure 8:
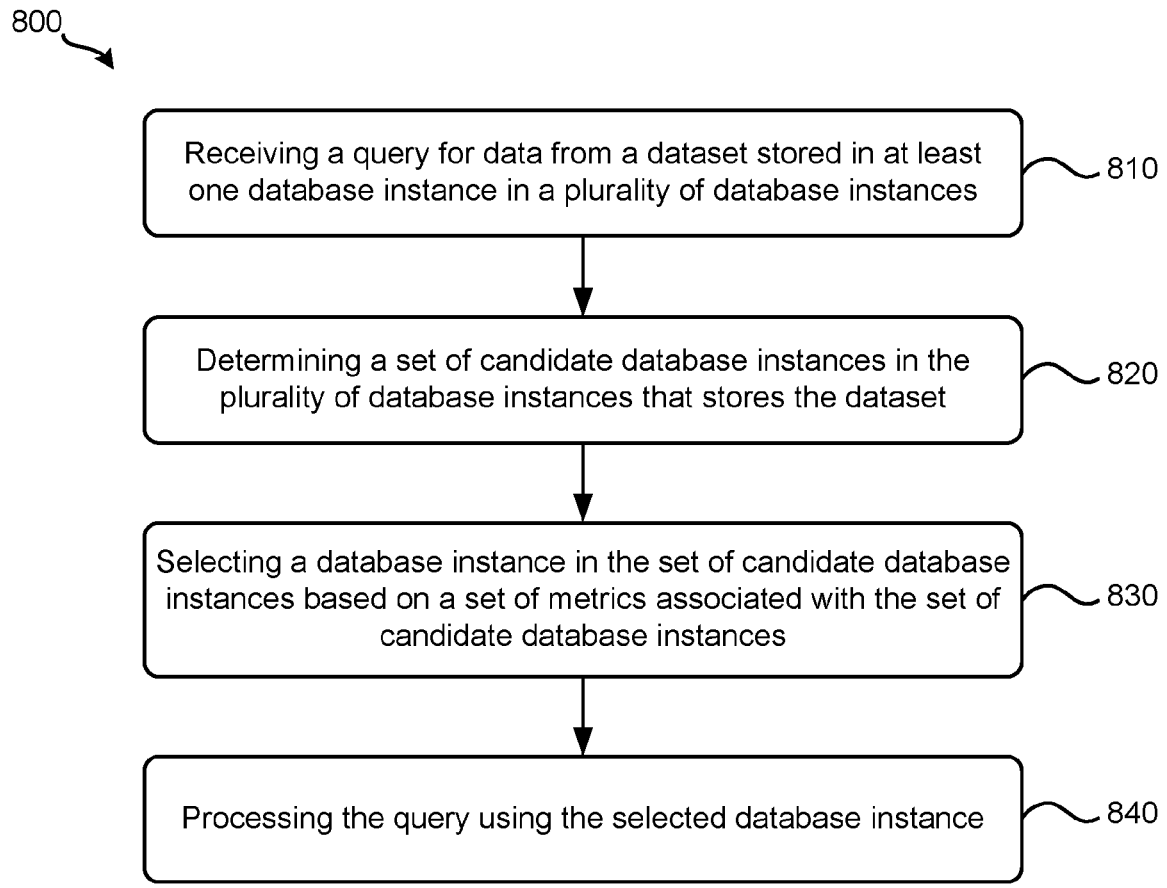
FIG. 8 illustrates a process for processing a query according to some embodiments.

FIG. 8 illustrates a process 800 for processing a query according to some embodiments. In some embodiments, EQS system 110 performs process 800. Process 800 begins by receiving, at 810, a query for data from a dataset stored in at least one database instance in a plurality of database instances. Referring to FIG. 1 as an example, query manager 115 may perform operation 810. In some embodiments, the plurality of database instances are the DB instances in the group of eligible DB instances. Referring to FIG. 2 as an example, the plurality of database instances may include master DB instance 160, slave DB instance 165a, and slave DB instances 165b. Upon receiving the query, process 800 can send the query to load balancer 135 for processing.

Next, process 800 determines, at 820, a set of candidate database instances in the plurality of database instances that stores the dataset. Referring to FIG. 1 as an example, load balancer 135 may perform operation 820. In some embodiments, process 800 makes such a determination by sending scaling manager 145 a request for a list of the eligible DB instances and the datasets stored on each of the eligible DB instance. Process 800 then identifies each database instance in the group of eligible DB instances that stores the set of datasets specified in the query and includes them in the set of candidate database instances.

Process 800 then selects, at 830, a database instance in the set of candidate database instances based on a set of metrics associated the set of candidate database instances. Referring to FIG. 1 as an example, load balancer 135 perform operation 830. Process 800 may request such metrics from metrics monitor 130. In some embodiments, the set of metrics include the resource usage (e.g., memory usage, CPU usage, etc.) of each DB instance in the set of DB instances and a dataset metric for the set of datasets stored in each DB instance in the set of DB instances. Process 800 may calculate a score for each database instance based on the metrics received from metrics monitor 130 (e.g., using the equation above to calculate a score for a DB instance i). After calculate such scores for the set of candidate database instances, process 800 may determine a defined number (e.g., three, five, seven, etc.) of database instances with the highest scores and then randomly select a database instance from the defined number of database instances with the highest scores as the database instance to use to process the query. Finally, process 800 processes, at 840, the query using the selected database instance. Referring to FIG. 2 as an example, the database instance selected among master DB instance 160, slave DB instance 165a, and slave DB instance 165b performs operation 840.

Figure 9:
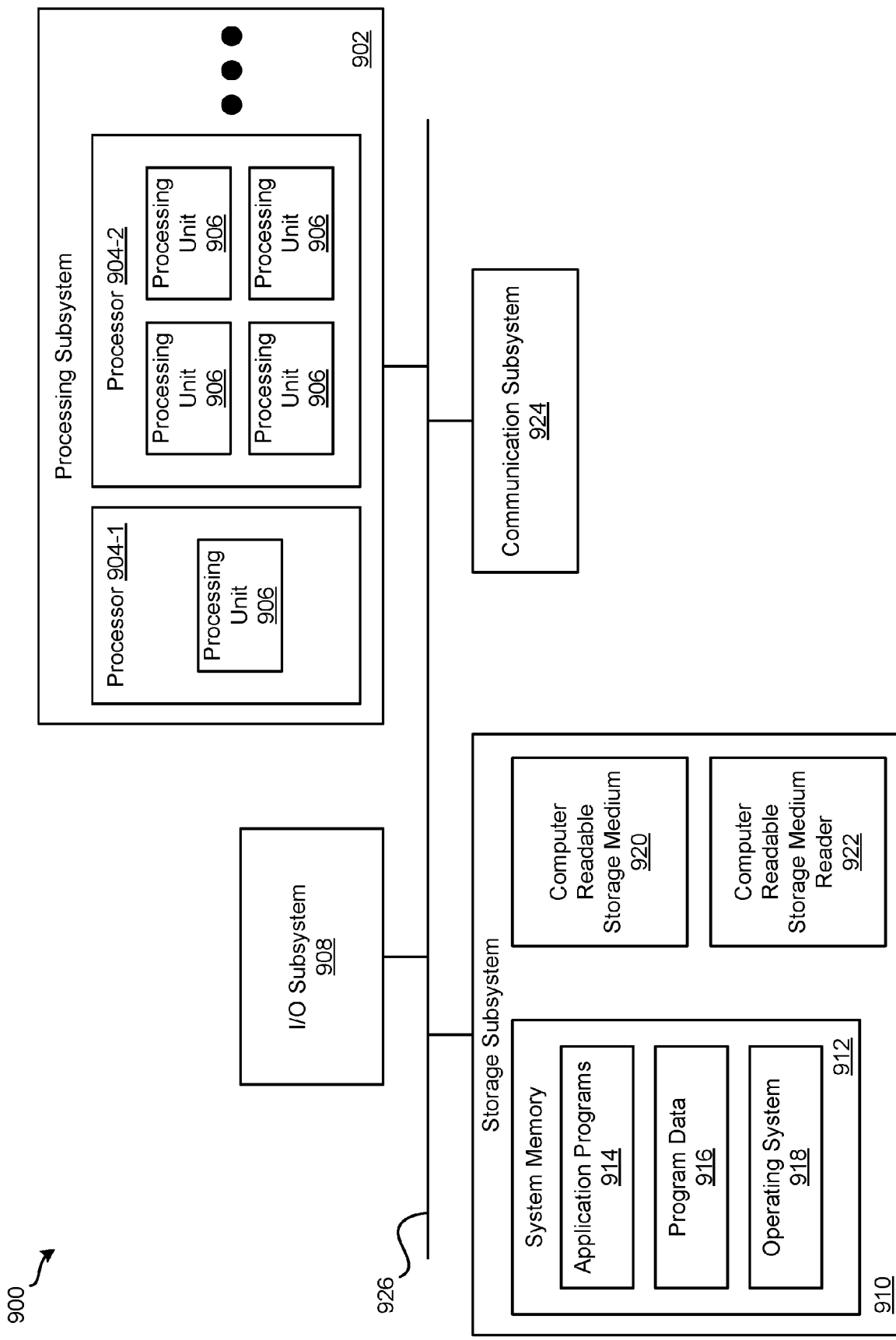
FIG. 9 illustrates an exemplary computer system for implementing various embodiments described above.

FIG. 9 illustrates an exemplary computer system 900 for implementing various embodiments described above. For example, computer system 900 may be used to implement clients 105a-n, EQS system 110, master DB instance 160, and slave DB instances 165a-k. Computer system 900 may be a desktop computer, a laptop, a server computer, or any other type of computer system or combination thereof. Computer system 900 can implement many of the operations, methods, and/or processes described above (e.g., processes 700 and 800). As shown in FIG. 9, computer system 900 includes processing subsystem 902, which communicates, via bus subsystem 926, with input/output (I/O) subsystem 908, storage subsystem 910 and communication subsystem 924.

Bus subsystem 926 is configured to facilitate communication among the various components and subsystems of computer system 900. While bus subsystem 926 is illustrated in FIG. 9 as a single bus, one of ordinary skill in the art will understand that bus subsystem 926 may be implemented as multiple buses. Bus subsystem 926 may be any of several types of bus structures (e.g., a memory bus or memory controller, a peripheral bus, a local bus, etc.) using any of a variety of bus architectures. Examples of bus architectures may include an Industry Standard Architecture (ISA) bus, a Micro Channel Architecture (MCA) bus, an Enhanced ISA (EISA) bus, a Video Electronics Standards Association (VESA) local bus, a Peripheral Component Interconnect (PCI) bus, a Universal Serial Bus (USB), etc.

Processing subsystem 902, which can be implemented as one or more integrated circuits (e.g., a conventional microprocessor or microcontroller), controls the operation of computer system 900. Processing subsystem 902 may include one or more processors 904. Each processor 904 may include one processing unit 906 (e.g., a single core processor such as processor 904-1) or several processing units 906 (e.g., a multicore processor such as processor 904-2). In some embodiments, processors 904 of processing subsystem 902 may be implemented as independent processors while, in other embodiments, processors 904 of processing subsystem 902 may be implemented as multiple processors integrate into a single chip or multiple chips. Still, in some embodiments, processors 904 of processing subsystem 902 may be implemented as a combination of independent processors and multiple processors integrated into a single chip or multiple chips.

In some embodiments, processing subsystem 902 can execute a variety of programs or processes in response to program code and can maintain multiple concurrently executing programs or processes. At any given time, some or all of the program code to be executed can reside in processing subsystem 902 and/or in storage subsystem 910. Through suitable programming, processing subsystem 902 can provide various functionalities, such as the functionalities described above by reference to process 700, process 800, etc.

I/O subsystem 908 may include any number of user interface input devices and/or user interface output devices. User interface input devices may include a keyboard, pointing devices (e.g., a mouse, a trackball, etc.), a touchpad, a touch screen incorporated into a display, a scroll wheel, a click wheel, a dial, a button, a switch, a keypad, audio input devices with voice recognition systems, microphones, image/video capture devices (e.g., webcams, image scanners, barcode readers, etc.), motion sensing devices, gesture recognition devices, eye gesture (e.g., blinking) recognition devices, biometric input devices, and/or any other types of input devices.

User interface output devices may include visual output devices (e.g., a display subsystem, indicator lights, etc.), audio output devices (e.g., speakers, headphones, etc.), etc. Examples of a display subsystem may include a cathode ray tube (CRT), a flat-panel device (e.g., a liquid crystal display (LCD), a plasma display, etc.), a projection device, a touch screen, and/or any other types of devices and mechanisms for outputting information from computer system 900 to a user or another device (e.g., a printer).

As illustrated in FIG. 9, storage subsystem 910 includes system memory 912, computer-readable storage medium 920, and computer-readable storage medium reader 922. System memory 912 may be configured to store software in the form of program instructions that are loadable and executable by processing subsystem 902 as well as data generated during the execution of program instructions. In some embodiments, system memory 912 may include volatile memory (e.g., random access memory (RAM)) and/or non-volatile memory (e.g., read-only memory (ROM), programmable read-only memory (PROM), erasable programmable read-only memory (EPROM), electrically erasable programmable read-only memory (EEPROM), flash memory, etc.). System memory 912 may include different types of memory, such as static random access memory (SRAM) and/or dynamic random access memory (DRAM). System memory 912 may include a basic input/output system (BIOS), in some embodiments, that is configured to store basic routines to facilitate transferring information between elements within computer system 900 (e.g., during start-up). Such a BIOS may be stored in ROM (e.g., a ROM chip), flash memory, or any other type of memory that may be configured to store the BIOS.

As shown in FIG. 9, system memory 912 includes application programs 914, program data 916, and operating system (OS) 918. OS 918 may be one of various versions of Microsoft Windows, Apple Mac OS, Apple OS X, Apple macOS, and/or Linux operating systems, a variety of commercially-available UNIX or UNIX-like operating systems (including without limitation the variety of GNU/Linux operating systems, the Google Chrome® OS, and the like) and/or mobile operating systems such as Apple iOS, Windows Phone, Windows Mobile, Android, BlackBerry OS, Blackberry 10, and Palm OS, WebOS operating systems.

Computer-readable storage medium 920 may be a non-transitory computer-readable medium configured to store software (e.g., programs, code modules, data constructs, instructions, etc.). Many of the components (e.g., query manager 115, cache manager 120, data access manager 125, metrics monitor 130, load balancer 135, message queue 140, scaling manager 145, replication manager 150, and resource manager 155) and/or processes (e.g., processes 700 and 800) described above may be implemented as software that when executed by a processor or processing unit (e.g., a processor or processing unit of processing subsystem 902) performs the operations of such components and/or processes. Storage subsystem 910 may also store data used for, or generated during, the execution of the software.

Storage subsystem 910 may also include computer-readable storage medium reader 922 that is configured to communicate with computer-readable storage medium 920. Together and, optionally, in combination with system memory 912, computer-readable storage medium 920 may comprehensively represent remote, local, fixed, and/or removable storage devices plus storage media for temporarily and/or more permanently containing, storing, transmitting, and retrieving computer-readable information.

Computer-readable storage medium 920 may be any appropriate media known or used in the art, including storage media such as volatile, non-volatile, removable, non-removable media implemented in any method or technology for storage and/or transmission of information. Examples of such storage media includes RAM, ROM, EEPROM, flash memory or other memory technology, compact disc read-only memory (CD-ROM), digital versatile disk (DVD), Blu-ray Disc (BD), magnetic cassettes, magnetic tape, magnetic disk storage (e.g., hard disk drives), Zip drives, solid-state drives (SSD), flash memory card (e.g., secure digital (SD) cards, CompactFlash cards, etc.), USB flash drives, or any other type of computer-readable storage media or device.

Communication subsystem 924 serves as an interface for receiving data from, and transmitting data to, other devices, computer systems, and networks. For example, communication subsystem 924 may allow computer system 900 to connect to one or more devices via a network (e.g., a personal area network (PAN), a local area network (LAN), a storage area network (SAN), a campus area network (CAN), a metropolitan area network (MAN), a wide area network (WAN), a global area network (GAN), an intranet, the Internet, a network of any number of different types of networks, etc.). Communication subsystem 924 can include any number of different communication components. Examples of such components may include radio frequency (RF) transceiver components for accessing wireless voice and/or data networks (e.g., using cellular technologies such as 2G, 3G, 4G, 5G, etc., wireless data technologies such as Wi-Fi, Bluetooth, ZigBee, etc., or any combination thereof), global positioning system (GPS) receiver components, and/or other components. In some embodiments, communication subsystem 924 may provide components configured for wired communication (e.g., Ethernet) in addition to or instead of components configured for wireless communication.

One of ordinary skill in the art will realize that the architecture shown in FIG. 9 is only an example architecture of computer system 900, and that computer system 900 may have additional or fewer components than shown, or a different configuration of components. The various components shown in FIG. 9 may be implemented in hardware, software, firmware or any combination thereof, including one or more signal processing and/or application specific integrated circuits.

Figure 10:
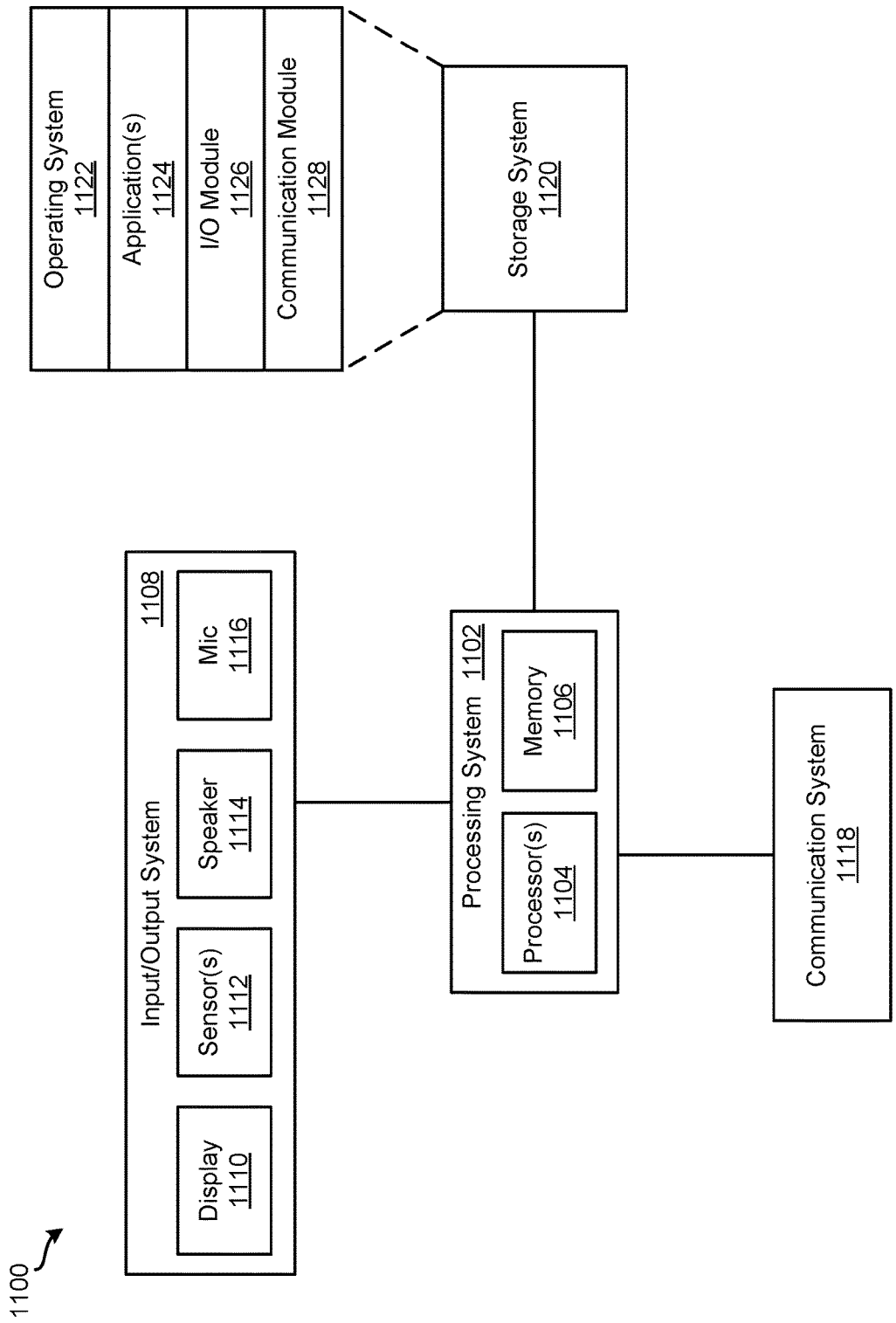
FIG. 10 illustrates an exemplary computing device for implementing various embodiments described above.

FIG. 10 illustrates an exemplary computing device 1000 for implementing various embodiments described above. For example, computing device 1000 may be used to implement clients 105a-n. Computing device 1000 may be a cellphone, a smartphone, a wearable device, an activity tracker or manager, a tablet, a personal digital assistant (PDA), a media player, or any other type of mobile computing device or combination thereof. As shown in FIG. 10, computing device 1000 includes processing system 1002, input/output (I/O) system 1008, communication system 1018, and storage system 1020. These components may be coupled by one or more communication buses or signal lines.

Processing system 1002, which can be implemented as one or more integrated circuits (e.g., a conventional microprocessor or microcontroller), controls the operation of computing device 1000. As shown, processing system 1002 includes one or more processors 1004 and memory 1006. Processors 1004 are configured to run or execute various software and/or sets of instructions stored in memory 1006 to perform various functions for computing device 1000 and to process data.

Each processor of processors 1004 may include one processing unit (e.g., a single core processor) or several processing units (e.g., a multicore processor). In some embodiments, processors 1004 of processing system 1002 may be implemented as independent processors while, in other embodiments, processors 1004 of processing system 1002 may be implemented as multiple processors integrate into a single chip. Still, in some embodiments, processors 1004 of processing system 1002 may be implemented as a combination of independent processors and multiple processors integrated into a single chip.

Memory 1006 may be configured to receive and store software (e.g., operating system 1022, applications 1024, I/O module 1026, communication module 1028, etc. from storage system 1020) in the form of program instructions that are loadable and executable by processors 1004 as well as data generated during the execution of program instructions. In some embodiments, memory 1006 may include volatile memory (e.g., random access memory (RAM)), non-volatile memory (e.g., read-only memory (ROM), programmable read-only memory (PROM), erasable programmable read-only memory (EPROM), electrically erasable programmable read-only memory (EEPROM), flash memory, etc.), or a combination thereof.

I/O system 1008 is responsible for receiving input through various components and providing output through various components. As shown for this example, I/O system 1008 includes display 1010, one or more sensors 1012, speaker 1014, and microphone 1016. Display 1010 is configured to output visual information (e.g., a graphical user interface (GUI) generated and/or rendered by processors 1004). In some embodiments, display 1010 is a touch screen that is configured to also receive touch-based input. Display 1010 may be implemented using liquid crystal display (LCD) technology, light-emitting diode (LED) technology, organic LED (OLED) technology, organic electro luminescence (OEL) technology, or any other type of display technologies. Sensors 1012 may include any number of different types of sensors for measuring a physical quantity (e.g., temperature, force, pressure, acceleration, orientation, light, radiation, etc.). Speaker 1014 is configured to output audio information and microphone 1016 is configured to receive audio input. One of ordinary skill in the art will appreciate that I/O system 1008 may include any number of additional, fewer, and/or different components. For instance, I/O system 1008 may include a keypad or keyboard for receiving input, a port for transmitting data, receiving data and/or power, and/or communicating with another device or component, an image capture component for capturing photos and/or videos, etc.

Communication system 1018 serves as an interface for receiving data from, and transmitting data to, other devices, computer systems, and networks. For example, communication system 1018 may allow computing device 1000 to connect to one or more devices via a network (e.g., a personal area network (PAN), a local area network (LAN), a storage area network (SAN), a campus area network (CAN), a metropolitan area network (MAN), a wide area network (WAN), a global area network (GAN), an intranet, the Internet, a network of any number of different types of networks, etc.). Communication system 1018 can include any number of different communication components. Examples of such components may include radio frequency (RF) transceiver components for accessing wireless voice and/or data networks (e.g., using cellular technologies such as 2G, 3G, 4G, 5G, etc., wireless data technologies such as Wi-Fi, Bluetooth, ZigBee, etc., or any combination thereof), global positioning system (GPS) receiver components, and/or other components. In some embodiments, communication system 1018 may provide components configured for wired communication (e.g., Ethernet) in addition to or instead of components configured for wireless communication.

Storage system 1020 handles the storage and management of data for computing device 1000. Storage system 1020 may be implemented by one or more non-transitory machine-readable mediums that are configured to store software (e.g., programs, code modules, data constructs, instructions, etc.) and store data used for, or generated during, the execution of the software.

In this example, storage system 1020 includes operating system 1022, one or more applications 1024, I/C) module 1026, and communication module 1028. Operating system 1022 includes various procedures, sets of instructions, software components and/or drivers for controlling and managing general system tasks (e.g., memory management, storage device control, power management, etc.) and facilitates communication between various hardware and software components. Operating system 1022 may be one of various versions of Microsoft Windows, Apple Mac OS, Apple OS X, Apple macOS, and/or Linux operating systems, a variety of commercially-available UNIX or UNIX-like operating systems (including without limitation the variety of GNU/Linux operating systems, the Google Chrome® OS, and the like) and/or mobile operating systems such as Apple iOS, Windows Phone, Windows Mobile, Android, BlackBerry OS, Blackberry 10, and Palm OS, WebOS operating systems.

Applications 1024 can include any number of different applications installed on computing device 1000. For example, such applications may include a browser application, an address book application, a contact list application, an email application, an instant messaging application, a word processing application, JAVA-enabled applications, an encryption application, a digital rights management application, a voice recognition application, location determination application, a mapping application, a music player application, etc.

I/O module 1026 manages information received via input components (e.g., display 1010, sensors 1012, and microphone 1016) and information to be outputted via output components (e.g., display 1010 and speaker 1014). Communication module 1028 facilitates communication with other devices via communication system 1018 and includes various software components for handling data received from communication system 1018.

One of ordinary skill in the art will realize that the architecture shown in FIG. 10 is only an example architecture of computing device 1000, and that computing device 1000 may have additional or fewer components than shown, or a different configuration of components. The various components shown in FIG. 10 may be implemented in hardware, software, firmware or any combination thereof, including one or more signal processing and/or application specific integrated circuits.

Figure 11:
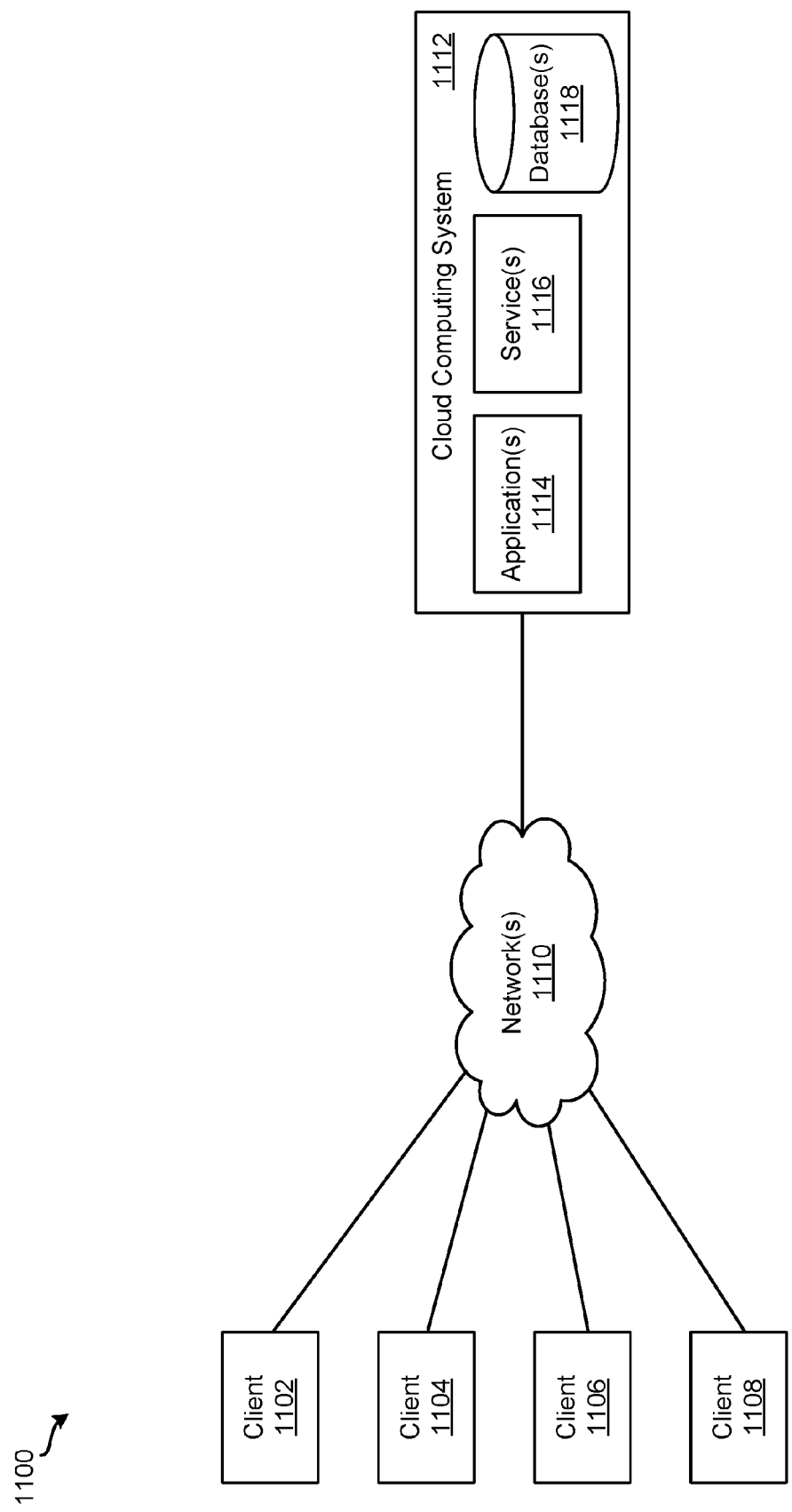
FIG. 11 illustrates an exemplary system for implementing various embodiments described above.

FIG. 11 illustrates an exemplary system 1100 for implementing various embodiments described above. For example, cloud computing system 1112 of system 1100 may be used to implement EQS system 110, master DB instance 160, and slave DB instances 165a-k. In addition, client devices 1102-1108 of system 1100 may be used to implement clients 105a-n. As shown, system 1100 includes client devices 1102-1108, one or more networks 1110, and cloud computing system 1112. Cloud computing system 1112 is configured to provide resources and data to client devices 1102-1108 via networks 1110. In some embodiments, cloud computing system 1100 provides resources to any number of different users (e.g., customers, tenants, organizations, etc.). Cloud computing system 1112 may be implemented by one or more computer systems (e.g., servers), virtual machines operating on a computer system, or a combination thereof.

As shown, cloud computing system 1112 includes one or more applications 1114, one or more services 1116, and one or more databases 1118. Cloud computing system 1100 may provide applications 1114, services 1116, and databases 1118 to any number of different customers in a self-service, subscription-based, elastically scalable, reliable, highly available, and secure manner.

In some embodiments, cloud computing system 1100 may be adapted to automatically provision, manage, and track a customer's subscriptions to services offered by cloud computing system 1100. Cloud computing system 1100 may provide cloud services via different deployment models. For example, cloud services may be provided under a public cloud model in which cloud computing system 1100 is owned by an organization selling cloud services and the cloud services are made available to the general public or different industry enterprises. As another example, cloud services may be provided under a private cloud model in which cloud computing system 1100 is operated solely for a single organization and may provide cloud services for one or more entities within the organization. The cloud services may also be provided under a community cloud model in which cloud computing system 1100 and the cloud services provided by cloud computing system 1100 are shared by several organizations in a related community. The cloud services may also be provided under a hybrid cloud model, which is a combination of two or more of the aforementioned different models.

In some instances, any one of applications 1114, services 1116, and databases 1118 made available to client devices 1102-1108 via networks 1110 from cloud computing system 1100 is referred to as a "cloud service." Typically, servers and systems that make up cloud computing system 1100 are different from the on-premises servers and systems of a customer. For example, cloud computing system 1100 may host an application and a user of one of client devices 1102-1108 may order and use the application via networks 1110.

Applications 1114 may include software applications that are configured to execute on cloud computing system 1112 (e.g., a computer system or a virtual machine operating on a computer system) and be accessed, controlled, managed, etc. via client devices 1102-1108. In some embodiments, applications 1114 may include server applications and/or mid-tier applications (e.g., HTTP (hypertext transport protocol) server applications, FTP (file transfer protocol) server applications, CGI (common gateway interface) server applications, JAVA server applications, etc.). Services 1116 are software components, modules, application, etc. that are configured to execute on cloud computing system 1112 and provide functionalities to client devices 1102-1108 via networks 1110. Services 1116 may be web-based services or on-demand cloud services.

Databases 1118 are configured to store and/or manage data that is accessed by applications 1114, services 1116, and/or client devices 1102-1108. For instance, master DB instance 160, slave DB instances 165*a-k*, and storage 170 may be stored in databases 1118. Databases 1118 may reside on a non-transitory storage medium local to (and/or resident in) cloud computing system 1112, in a storage-area network (SAN), on a non-transitory storage medium local located remotely from cloud computing system 1112. In some embodiments, databases 1118 may include relational databases that are managed by a relational database management system (RDBMS). Databases 1118 may be a column-oriented databases, row-oriented databases, or a combination thereof. In some embodiments, some or all of databases 1118 are in-memory databases. That is, in some such embodiments, data for databases 1118 are stored and managed in memory (e.g., random access memory (RAM)).

Client devices 1102-1108 are configured to execute and operate a client application (e.g., a web browser, a proprietary client application, etc.) that communicates with applications 1114, services 1116, and/or databases 1118 via networks 1110. This way, client devices 1102-1108 may access the various functionalities provided by applications 1114, services 1116, and databases 1118 while applications 1114, services 1116, and databases 1118 are operating (e.g., hosted) on cloud computing system 1100. Client devices 1102-1108 may be computer system 900 or computing device 1000, as described above by reference to FIGS. 9 and 10, respectively. Although system 1100 is shown with four client devices, any number of client devices may be supported.

Networks 1110 may be any type of network configured to facilitate data communications among client devices 1102-1108 and cloud computing system 1112 using any of a variety of network protocols. Networks 1110 may be a personal area network (PAN), a local area network (LAN), a storage area network (SAN), a campus area network (CAN), a metropolitan area network (MAN), a wide area network (WAN), a global area network (GAN), an intranet, the Internet, a network of any number of different types of networks, etc.

The above description illustrates various embodiments of the present invention along with examples of how aspects of the present invention may be implemented. The above examples and embodiments should not be deemed to be the only embodiments, and are presented to illustrate the flexibility and advantages of the present invention as defined by the following claims. Based on the above disclosure and the following claims, other arrangements, embodiments, implementations and equivalents will be evident to those skilled in the art and may be employed without departing from the spirit and scope of the invention as defined by the claims.

What is claimed is:

1. A non-transitory machine-readable medium storing a program executable by at least one processing unit of a computing device, the program comprising sets of instructions for:

receiving a query for data from a dataset stored in at least one database instance in a plurality of database instances, wherein the plurality of database instances includes a master database instance configured to store a plurality of datasets and a set of slave database instances, wherein each slave database instance in the set of slave database instances is configured to store one or more datasets stored in the master database instance;

determining a set of candidate database instances in the plurality of database instances that stores the dataset, wherein each candidate database instance in the set of candidate database instances stores the dataset;

selecting a database instance in the set of candidate database instances based on a set of metrics associated with the set of candidate database instances; and processing the query using the selected database instance.

2. The non-transitory machine-readable medium of claim 1, wherein the set of metrics includes resource usage of the set of candidate database instances and a set of dataset metric based on a plurality of queries for data from the dataset previously processed by the set of candidate database instances.

3. The non-transitory machine-readable medium of claim 2, wherein selecting the database instance comprises:

identifying a subset of candidate database instances in the set of candidate database instances having a metric that is higher than the remaining candidate database instances in the set of candidate database instances; and randomly selecting a candidate database instance in the subset of candidate database instances as the selected database instance.

4. The non-transitory machine-readable medium of claim 2, wherein each dataset metric in the set of dataset metrics is calculated based on a set of response times for the set of queries in the plurality of queries for data from the dataset previously processed by the associated candidate database instance.

5. The non-transitory machine-readable medium of claim 2, wherein the plurality of queries for data from the dataset are previously processed by the set of candidate database instances within a defined interval of time.

6. The non-transitory machine-readable medium of claim 1, wherein the query is a first query for data from a first dataset, wherein the set of candidate database instances is a first set of candidate database instances, wherein the database instance is a first database instance, wherein the program further comprises sets of instructions for:
receiving a second query for data from a second dataset stored in at least one database instance in the plurality of database instances;
determining a second set of candidate database instances in the plurality of database instances that stores the second dataset, wherein each candidate database instance in the second set of candidate database instances stores the second dataset;
selecting a second database instance in the second set of candidate database instances based on the set of metrics associated with the second set of candidate database instances; and
processing the second query using the selected, second database instance.

7. The non-transitory machine-readable medium of claim 1, wherein the program further comprises sets of instructions for:
determining information associated with the processing of the query; and
storing the information for later retrieval in the processing of additional queries for data from the dataset.

8. A method comprising:
receiving a query for data from a dataset stored in at least one database instance in a plurality of database instances, wherein the plurality of database instances includes a master database instance configured to store a plurality of datasets and a set of slave database instances, wherein each slave database instance in the set of slave database instances is configured to store one or more datasets stored in the master database instance;
determining a set of candidate database instances in the plurality of database instances that stores the dataset, wherein each candidate database instance in the set of candidate database instances stores the dataset;
selecting a database instance in the set of candidate database instances based on a set of metrics associated with the set of candidate database instances; and
processing the query using the selected database instance.

9. The method of claim 8, wherein the set of metrics includes resource usage of the set of candidate database instances and a set of dataset metric based on a plurality of queries for data from the dataset previously processed by the set of candidate database instances.

10. The method of claim 9, wherein selecting the database instance comprises:
identifying a subset of candidate database instances in the set of candidate database instances having a metric that is higher than the remaining candidate database instances in the set of candidate database instances; and
randomly selecting a candidate database instance in the subset of candidate database instances as the selected database instance.

11. The method of claim 9, wherein each dataset metric in the set of dataset metrics is calculated based on a set of response times for the set of queries in the plurality of queries for data from the dataset previously processed by the associated candidate database instance.

12. The method of claim 9, wherein the plurality of queries for data from the dataset are previously processed by the set of candidate database instances within a defined interval of time.

13. The method of claim 8, wherein the query is a first query for data from a first dataset, wherein the set of candidate database instances is a first set of candidate database instances, wherein the database instance is a first database instance, wherein the method further comprises:
receiving a second query for data from a second dataset stored in at least one database instance in the plurality of database instances;
determining a second set of candidate database instances in the plurality of database instances that stores the second dataset, wherein each candidate database instance in the second set of candidate database instances stores the second dataset;
selecting a second database instance in the second set of candidate database instances based on the set of metrics associated with the second set of candidate database instances; and
processing the second query using the selected, second database instance.

14. The method of claim 8 further comprising:
determining information associated with the processing of the query; and
storing the information for later retrieval in the processing of additional queries for data from the dataset.

15. A first computing system comprising:
a set of processing units; and
a non-transitory computer-readable medium storing instructions that when executed by at least one processing unit in the set of processing units cause the at least one processing unit to:
receive a query for data from a dataset stored in at least one database instance in a plurality of database instances, wherein the plurality of database instances includes a master database instance configured to store a plurality of datasets and a set of slave database instances, wherein each slave database instance in the set of slave database instances is configured to store one or more datasets stored in the master database instance;
determine a set of candidate database instances in the plurality of database instances that stores the dataset, wherein each candidate database instance in the set of candidate database instances stores the dataset;
select a database instance in the set of candidate database instances based on a set of metrics associated with the set of candidate database instances; and
process the query using the selected database instance.

16. The first computing system of claim 15, wherein the set of metrics includes resource usage of the set of candidate database instances and a set of dataset metric based on a plurality of queries for data from the dataset previously processed by the set of candidate database instances.

17. The first computing system of claim 16, wherein selecting the database instance comprises:
identifying a subset of candidate database instances in the set of candidate database instances having a metric that is higher than the remaining candidate database instances in the set of candidate database instances; and
randomly selecting a candidate database instance in the subset of candidate database instances as the selected database instance.

18. The first computing system of claim 16, wherein each dataset metric in the set of dataset metrics is calculated based on a set of response times for the set of queries in the plurality of queries for data from the dataset previously processed by the associated candidate database instance.

19. The first computing system of claim 15, wherein the query is a first query for data from a first dataset, wherein the set of candidate database instances is a first set of candidate database instances, wherein the database instance is a first database instance, wherein the instructions further cause the at least one processing unit to:
- receive a second query for data from a second dataset stored in at least one database instance in the plurality of database instances;
- determine a second set of candidate database instances in the plurality of database instances that stores the second dataset, wherein each candidate database instance in the second set of candidate database instances stores the second dataset;
- select a second database instance in the second set of candidate database instances based on the set of metrics associated with the second set of candidate database instances; and
- process the second query using the selected, second database instance.

20. The first computing system of claim 15, wherein the instructions further cause the at least one processing unit to:
- determine information associated with the processing of the query; and
- store the information for later retrieval in the processing of additional queries for data from the dataset.

\* \* \* \* \*